(12) United States Patent
Fang et al.

(10) Patent No.: US 11,327,019 B2
(45) Date of Patent: May 10, 2022

(54) INTEGRATION SYSTEM OF RAMAN SPECTROSCOPY WITH ADVANCED LIGHT MICROSCOPY AND APPLICATIONS OF SAME

(71) Applicants: Ning Fang, Alpharetta, GA (US); Bin Dong, Atlanta, GA (US); Kuangcai Chen, Alpharetta, GA (US); Fei Zhao, Atlanta, GA (US)

(72) Inventors: Ning Fang, Alpharetta, GA (US); Bin Dong, Atlanta, GA (US); Kuangcai Chen, Alpharetta, GA (US); Fei Zhao, Atlanta, GA (US)

(*) Notice: Subject to any disclaimer, the term of this patent is extended or adjusted under 35 U.S.C. 154(b) by 0 days.

(21) Appl. No.: 17/268,510

(22) PCT Filed: Aug. 16, 2019

(86) PCT No.: PCT/US2019/046750
§ 371 (c)(1),
(2) Date: Feb. 15, 2021

(87) PCT Pub. No.: WO2020/037175
PCT Pub. Date: Feb. 20, 2020

(65) Prior Publication Data
US 2021/0318245 A1    Oct. 14, 2021

Related U.S. Application Data

(60) Provisional application No. 62/719,412, filed on Aug. 17, 2018.

(51) Int. Cl.
*G01J 3/44* (2006.01)
*G01N 21/64* (2006.01)
(Continued)

(52) U.S. Cl.
CPC ........ *G01N 21/6458* (2013.01); *G01J 3/0208* (2013.01); *G01J 3/0294* (2013.01);
(Continued)

(58) Field of Classification Search
CPC .... G01J 3/02; G01J 3/44; G01J 3/0208; G01J 3/4406; G01J 3/0294; G01J 3/4412;
(Continued)

(56) References Cited

U.S. PATENT DOCUMENTS

| 2013/0082180 A1* | 4/2013 | Priore | G01N 21/64 250/339.07 |
| 2017/0016814 A1 | 1/2017 | Shirai et al. | |
| 2017/0023661 A1 | 1/2017 | Richert et al. | |

FOREIGN PATENT DOCUMENTS

JP    2018-128325 A    8/2018

OTHER PUBLICATIONS

KIPO (ISR/KR), "International Search Report for PCT/US2019/046750", Korea, dated Dec. 2, 2019.
(Continued)

*Primary Examiner* — Abdullahi Nur
(74) *Attorney, Agent, or Firm* — Locke Lord LLP; Tim Tingkang Xia, Esq.

(57) ABSTRACT

An integrated spectro-microscopic system for multimodality imaging on a sample includes a reflected differential interference contrast (RDIC) microscope, a Raman spectroscope optically coupled with the RDIC microscope and a total internal reflection fluorescence/scattering (TIRF/TIRS) microscope optically coupled with the RDIC microscope such that the integrated spectro-microscopic system is capable of simultaneously acquiring both the RDIC images, the Raman spectra and TIRF/TIRS images on the same sample.

18 Claims, 11 Drawing Sheets

(51) Int. Cl.
*G01J 3/02* (2006.01)
*G01N 21/65* (2006.01)
*G02B 21/00* (2006.01)

(52) U.S. Cl.
CPC ........... *G01J 3/4406* (2013.01); *G01J 3/4412* (2013.01); *G01N 21/65* (2013.01); *G02B 21/0032* (2013.01); *G02B 21/0076* (2013.01)

(58) Field of Classification Search
CPC ............... G01N 21/6458; G01N 21/65; G02B 21/0032; G02B 21/0076
See application file for complete search history.

(56) References Cited

OTHER PUBLICATIONS

Zhang, P. et al., "Combination of Raman tweezers and quantitative differential interference contrast microscopy form measurement of dynamics and heterogeneity during the germination of individual bacterial spore", Journal of Biomedical Optics, 2010, vol. 15, No. 5.

Marchuk, K., "The development of optical microscopy techniques for the advancement of single-particle studies", Iowa State University, 2013.

* cited by examiner

Solvent Annealing Stage

Heating Annealing Stage

400

FIG. 6A  FIG. 6B
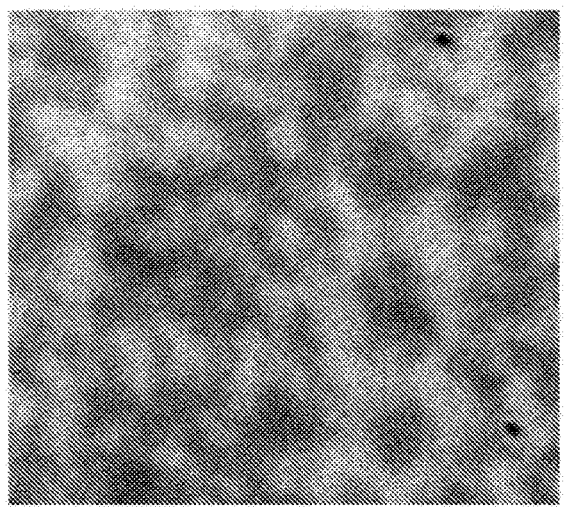 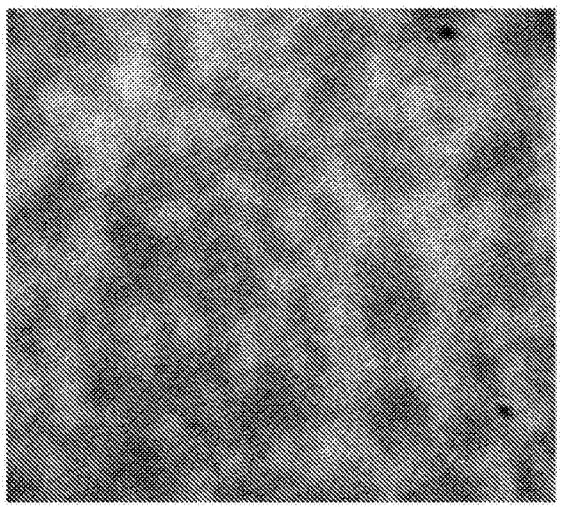
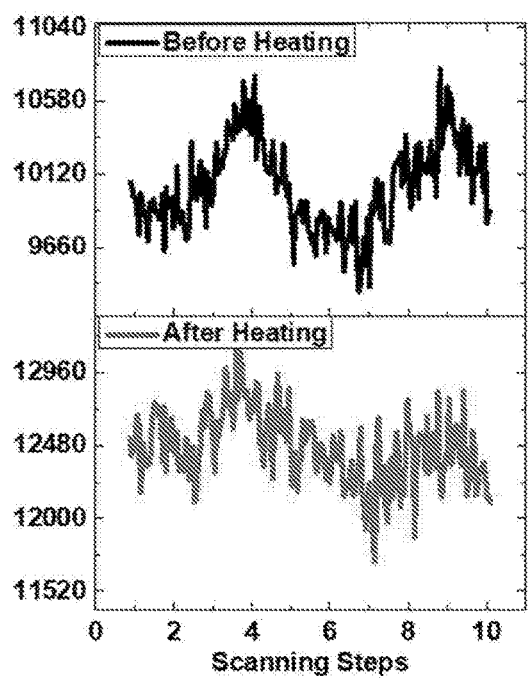 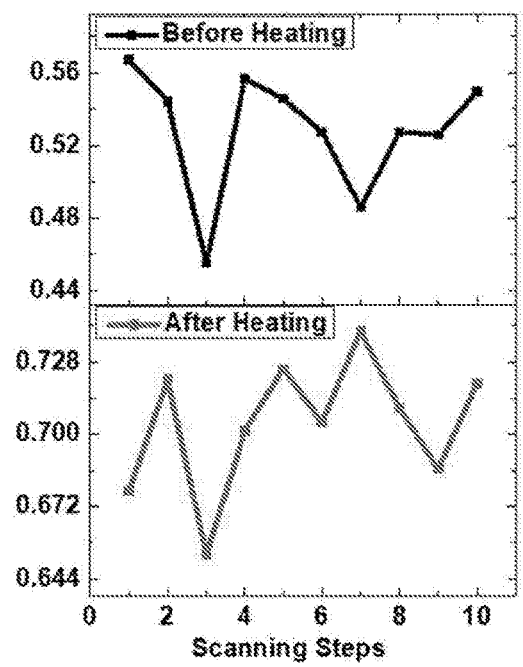
FIG. 6C  FIG. 6D

INTEGRATION SYSTEM OF RAMAN SPECTROSCOPY WITH ADVANCED LIGHT MICROSCOPY AND APPLICATIONS OF SAME

CROSS-REFERENCE TO RELATED PATENT APPLICATION

This application claims priority to and the benefit of, pursuant to 35 U.S.C. § 119(e), U.S. Provisional Patent Application Ser. No. 62/719,412, filed Aug. 17, 2018, which is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [19] represents the 19th reference cited in the reference list, namely, Wang, G.; Sun, W.; Luo, Y.; Fang, N., Resolving rotational motions of nanoobjects in engineered environments and live cells with gold nanorods and differential interference contrast microscopy. *J Am Chem Soc* 2010, 132 (46), 16417-22.

FIELD OF THE INVENTION

The invention relates generally to the field of spectroscopy and microscopy, and more particularly, to an integration system of Raman spectroscopy with advanced light microscopy and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Optical microscopy imaging has been playing an increasingly important role in the investigations of nanomaterials and biomaterials and fundamental chemical processes (e.g., diffusion, adsorption and reaction) at the molecular and nanoscale level. However, its wide chemical applications have been hindered by the absence of definitive chemical information of the sample in light microscopy images. Spectroscopic techniques (Raman, IR, etc.) are often required as companion tools to gain structural fingerprints of the sample. A system that can provide both physical and chemical characteristics of samples simultaneously is necessary for a fuller understanding of physicochemical characteristics [1-9].

To this date, it is still challenging to perform in-situ microscopic and spectroscopic measurements of the exact same sample (or the exact same region of a sample), especially for samples undergoing continuous transformations [10-16]. The existing multi-modality spectro-microscopic systems employ microscopy modes mostly for relatively simple purposes, such as sample positioning and fluorescence image acquisition. The more advanced features, including single molecule sensitivity, sub-diffraction-limited spatial resolution, and fast (millisecond range) temporal resolution, that has become the trademarks of microscopy development in the past decade, have rarely been combined with spectroscopic measurements.

On the other hand, new challenges and opportunities evolve at the intermediate scales (length scales from ~10 nm to 10 μm) between nano- and traditional macro-scale (bulk) materials. Many functional materials begin to manifest their functional behaviors starting at mesoscale, where nanoscale building blocks are assembled into more complex functional architectures for more diverse interactions with the environment and greater functionality. Even though enormous studies have gained significant progress on nanoscale structures in the past decades, mesoscale structures, which are intrinsically dynamic and metastable, remain relatively unexplored. The lack of knowledge in mesoscale has restrained our ability to predict and optimize the performance of functional materials and often limit their application to trial and error. In situ multi-modality characterization systems, capable of performing and correlating various physical and chemical measurements of the same sample area undergoing continuous transformations under environmental stimuli, are much needed to monitor and understand the evolution of mesoscale materials.

Therefore, a heretofore unaddressed need exists in the art to address the aforementioned deficiencies and inadequacies.

SUMMARY OF THE INVENTION

One of the objectives of the invention is to provide a novel high-sensitivity multi-functional spectro-microscopic system that combines far-field optical microscopy imaging (fluorescence, dark-field, interferometry, total internal reflection (TIR), quantitative polarization, etc.) with Raman-based spectroscopic techniques (confocal Raman, surface enhanced Raman spectroscopy (SERS), etc.) for in-situ studies of nanoscale and mesoscale structures and dynamics. Different sample stages have also been developed for imaging under more challenging experimental conditions, e.g., thermal stress or solvent vapor, to enable in situ monitoring of the samples.

In one aspect of the invention, the integrated spectro-microscopic system for multimodality imaging on a sample includes a reflected differential interference contrast (RDIC) microscope; and a Raman spectroscope optically coupled with the RDIC microscope such that the integrated spectro-microscopic system is capable of simultaneously acquiring both RDIC images and Raman spectra on the same sample. The RDIC microscope can also be used to collect quantitative polarization microscopy images by removing the Nomarski prism and properly setting the polarization direction of the light. The integrated spectro-microscopic system may further include a total internal reflection fluorescence/scattering (TIRF/TIRS) microscope optically coupled with the RDIC microscope such that the integrated spectro-microscopic system is capable of simultaneously acquiring the RDIC and polarization microscopy images, the Raman spectra and TIRF/TIRS images on the same sample.

In one embodiment, the integrated spectro-microscopic system is capable of individually acquiring the RDIC and polarization microscopy images, the Raman spectra and the TIRF/TIRS images on the same sample, by removing selected optical components.

In one embodiment, each of the RDIC and polarization microscope, the Raman spectroscope and the TIRF/TIRS microscope comprises a delivering means for delivering incident light emitted from a corresponding light source to the sample placed on a substrate to illuminate the sample therewith, and a collecting means for collecting light from the illuminated sample responsive to the illumination of the incident light.

In one embodiment, the substrate comprises a quartz slide coated with a nanometer thickness gold film on which the sample is placed.

In one embodiment, the delivering means of the RDIC microscope comprises a linear polarizer, a beamsplitter, a Nomarski prism and an objective lens placed in a first optical path that is an incident light path of the RDIC microscope such that the beamsplitter is placed at 45° to the incident light; the Nomarski prism is positioned at a rear focal plane of the objective lens, and is operably translated laterally across the optical path to introduce bias retardation to achieve best image contrast for the sample; and the objective lens is positioned proximate to the sample and operably collimates sheared orthogonal wavefronts onto the sample.

In one embodiment, the collecting means of the RDIC microscope comprises the objective lens, the Nomarski prism, the beamsplitter, an analyzer and a tube lens placed in a second optical path such that light from the sample responsive to illumination of the collimated orthogonal wavefronts is collected by the objective lens and focused onto an interference plane of the Nomarski prism, passes the beamsplitter and the analyzer, and is focused on a camera by the tube lens.

In one embodiment, the delivering means of the Raman spectroscope comprises the beamsplitter, the objective lens and an operably removable mirror positioned between the linear polarizer and the beamsplitter in the first optical path such that when the operably removable mirror is removed, no incident light of the Raman microscope is delivered to the sample.

In one embodiment, the collecting means of the Raman spectroscope comprises the objective lens, the beamsplitter, the tube lens and a mirror placed in the second optical path such that Raman signals emitted from the sample responsive to illumination of the incident light of the Raman spectroscope is collected by the objective lens and passes the beamsplitter and the tube lens, and is reflected through a third optical path to a detector of the Raman spectroscope.

In one embodiment, the delivering means of the TIRF/TIRS microscope comprises a prism positioned in relation to the sample and a plurality of optical components placed in an incident light path of the TIRF/TIRS microscope for delivering incident light to the prism at an incident angle larger that than the critical angle, so that the incidence light is completely reflected and an evanescent field is generated to selectively illuminate and excite fluorophores of the sample within the evanescent field, wherein the substrate is between the sample and the prism.

In one embodiment, the collecting means of the TIRF/TIRS microscope comprises the objective lens, the beam-splitter, and the tube lens placed in the second optical path such that light emitted from the selectively excited fluorophores of the sample is collected by the objective lens and passes the beamsplitter, and is focused on the camera by the tube lens.

In one embodiment, the beamsplitter plate is a dichroic mirror.

In one embodiment, the integrated spectro-microscopic system further includes a sample stage for coupling the prism-type TIRF microscope to the integrated spectro-microscopic system.

In one embodiment, the sample stage has a notch designed for accommodating the prism so as to enable us to directly mount the sample plate on the top of the prism, thereby, allowing the simultaneous acquisition of TRIFM images, RDIC images and Raman spectra. In one embodiment, the sample stage is an in situ thermal annealing stage and/or an in situ solvent annealing stage.

In one embodiment, the integrated spectro-microscopic system further includes an autofocus module for providing high stability of the integrated spectro-microscopic system.

In one embodiment, the integrated spectro-microscopic system further includes a multi-modality imaging collection module for different microscopy/spectroscopy modalities.

In one embodiment, the multi-modality, multi-view imaging collection module is a fully automated, multi-modality dual view imaging and spectroscopy module that is capable of simultaneously single molecule fluorescence imaging and single molecule spectroscopy imaging; single molecule localization based 2D/3D super-resolution imaging; two-color imaging; and polarization imaging.

In one embodiment, the multi-modality, multi-view imaging collection module is a multi-modality, multi-color, 4-channel imaging module that can enable the 3D single particle tracking capability through bifocal imaging or point spread function (PSF) engineering including parallax imaging, double-helix PSF, and astigmatism.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIGS. 6A-6B show respectively reflected differential interference contrast (RDIC) images of 1:1 P3HT: PCBM blend film before thermal annealing and after 30 mins thermal annealing according to one embodiment of the invention.

FIG. 6C shows RDIC intensity trace before and after thermal annealing along the dot lines shown in FIG. 6A-6B according to one embodiment of the invention.

FIG. 6D shows fractions of regioregular P3HT in the blend before and after thermal annealing along the dot lines shown in FIG. 6A-6B according to one embodiment of the invention.

DETAILED DESCRIPTION OF THE INVENTION

Figure 1A:
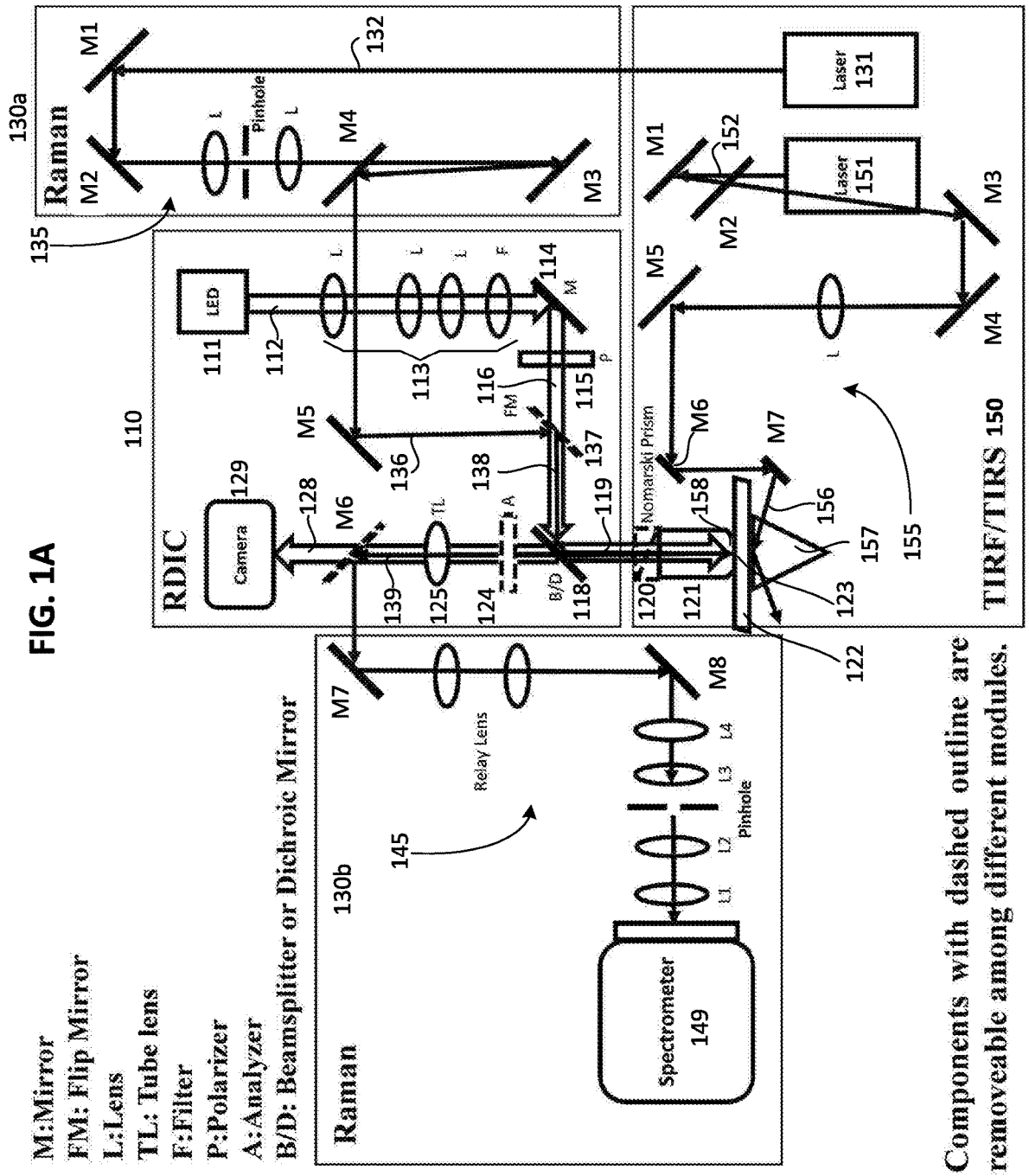
FIG. 1A shows a schematic setup of an integration system according to one embodiment of the invention.
Figure 1B:
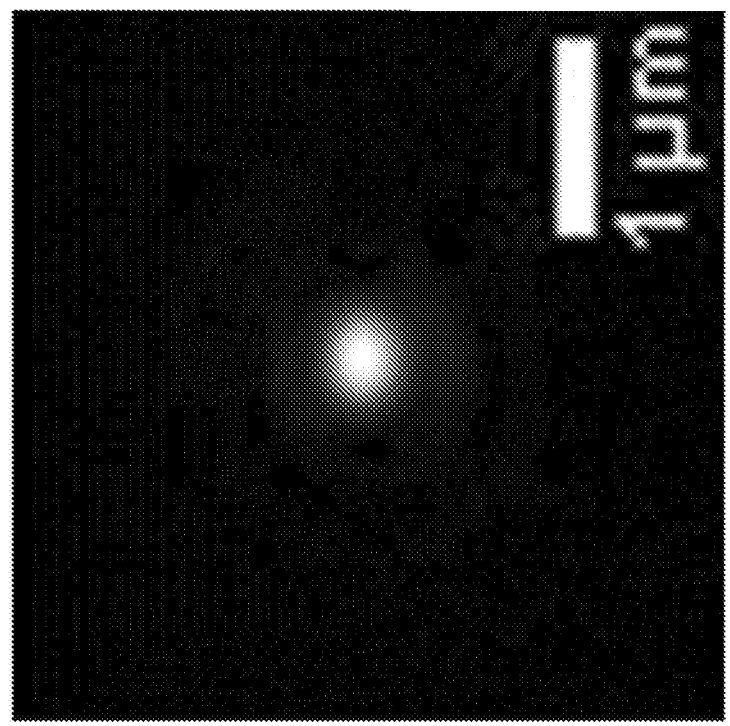
FIG. 1B shows an intensity distribution of confocal Raman laser spot according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can, therefore, encompasses both an orientation of "lower" and "upper," depending on the particular orientation of the figure. Similarly, if the device in one of the figures. is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

The invention relates to a novel high-sensitivity multifunctional spectro-microscopic system that combines far-field optical microscopy imaging (fluorescence, dark-field, interferometry, total internal reflection, polarization, etc.) with Raman-based spectroscopic techniques (confocal Raman, surface enhanced Raman spectroscopy (SERS), etc.) for in-situ studies of nanoscale and mesoscale structures and dynamics. Different sample stages have also been developed for imaging under more challenging experiment conditions, e.g., thermal stress or solvent vapor, to enable in situ monitoring of the samples.

The in-situ imaging capability of this invented system makes it a valuable characterization technique complementary to other conventional methods, such as electron microscopy and scanning probe microscopy. It provides a high throughput optical instrument operating under ambient or controlled conditions using light sources. It stimulates new scientific explorations that were previously unattainable by providing scientists with a new capability in acquiring and correlating a broad range of information of their samples dynamically with sub-micron spatial resolution.

When a transformation is subtle or spectroscopic measurements of fine sample structures are needed, high resolution and high contrast microscopic techniques that can quickly locate and observe the subtle structures are required while spectroscopic measurements are taken. Then, the high resolution and high contrast images of physical morphology changes can be correlated with the spectroscopic changes, which indicates the chemical property changes dynamically. High throughput is an advantage of wide-field optical microscopy imaging techniques over other high resolution and high contrast techniques, such as electron microscopy, scanning probe microscopy, atomic force microscopy and near-field scanning optical microscopy. Near-field scanning optical microscopy has low incident light intensity hindering excitation of weak fluorescent molecules and is not suitable for imaging soft materials because of the high spring constants of the optical fibers [8]. High resolution and high contrast optical microscopy techniques can be used to quickly scan and locate the interesting areas, structures, or domains that are under physical or chemical transformations. Through the combination of microscopic and spectroscopic techniques, physical and chemical processes can be correlated and discerned. Optical microscopic imaging techniques are also advantageous because they are less invasive; thus, the sample integrity is usually maintained throughout the sampling process enabling the study of dynamic progressions over an extended timeframe. Usually, for samples observed under optical microscopy imaging techniques, no special sample preparations are needed; therefore, samples can be observed and studied under their working conditions. Raman spectroscopy can provide rich information about chemical structures without special sample preparation requirements, making it capable of in situ experiments [8, 17]. Also, since the system can be operated in an open and ambient environment, different conditions such as temperature, pH and electronic voltages can be applied to the sample with various designs of sample holder. By changing the immersion objectives, sampling in different environments like water or air is made possible.

In one aspect of the invention, the integrated spectro-microscopic system for multimodality imaging on a sample includes a reflected differential interference contrast (RDIC) microscope, a Raman spectroscope optically coupled with the RDIC microscope and a total internal reflection fluorescence/scattering (TIRF/TIRS) microscope optically coupled with the RDIC microscope such that the integrated spectro-microscopic system is capable of simultaneously acquiring both the RDIC images, the Raman spectra and TIRF/TIRS images on the same sample.

In one embodiment, the integrated spectro-microscopic system is capable of individually acquiring the RDIC images, the Raman spectra and the TIRF/TIRS images on the same sample, by removing selected optical components.

In one embodiment, each of the RDIC microscope, the Raman spectroscope and the TIRF/TIRS microscope comprises a delivering means for delivering incident light emitted from a corresponding light source to the sample placed on a substrate to illuminate the sample therewith, and a collecting means for collecting light from the illuminated sample responsive to the illumination of the incident light.

In one embodiment, the substrate comprises a quartz slide coated with a nanometer thickness gold film on which the sample is placed.

In one embodiment, the delivering means of the RDIC microscope comprises a linear polarizer, a beamsplitter, a Nomarski prism and an objective lens placed in a first optical path that is an incident light path of the RDIC microscope such that the beamsplitter is placed at 45° to the incident light; the Nomarski prism is positioned at a rear focal plane of the objective lens, and is operably translated laterally across the optical path to introduce bias retardation to achieve best image contrast for the sample; and the objective lens is positioned proximate to the sample and operably collimates sheared orthogonal wavefronts onto the sample.

In one embodiment, the collecting means of the RDIC microscope comprises the objective lens, the Nomarski prism, the beamsplitter, an analyzer and a tube lens placed in a second optical path such that light from the sample responsive to illumination of the collimated orthogonal wavefronts is collected by the objective lens and focused onto an interference plane of the Nomarski prism, passes the beamsplitter and the analyzer, and is focused on a camera by the tube lens.

In one embodiment, the delivering means of the Raman spectroscope comprises the beamsplitter, the objective lens and an operably removable mirror positioned between the linear polarizer and the beamsplitter in the first optical path such that when the operably removable mirror is removed, no incident light of the Raman microscope is delivered to the sample.

In one embodiment, the collecting means of the Raman spectroscope comprises the objective lens, the beamsplitter, the tube lens and a mirror placed in the second optical path such that Raman signals emitted from the sample responsive to illumination of the incident light of the Raman spectroscope is collected by the objective lens and passes the beamsplitter and the tube lens, and is reflected through a third optical path to a detector of the Raman spectroscope.

In one embodiment, the delivering means of the TIRF/TIRS microscope comprises a prism positioned in relation to the sample and a plurality of optical components placed in an incident light path of the TIRF/TIRS microscope for delivering incident light to the prism at an incident angle larger that than the critical angle, so that the incidence light is completely reflected and an evanescent field is generated to selectively illuminate and excite fluorophores of the sample within the evanescent field, wherein the substrate is between the sample and the prism.

In one embodiment, the collecting means of the TIRF/TIRS microscope comprises the objective lens, the beamsplitter, and the tube lens placed in the second optical path such that light emitted from the selectively excited fluorophores of the sample is collected by the objective lens and passes the beamsplitter, and is focused on the camera by the tube lens.

In one embodiment, the beamsplitter plate is a dichroic mirror.

In one embodiment, the integrated spectro-microscopic system further includes a sample stage for coupling the prism-type TIRF microscope to the integrated spectro-microscopic system.

In one embodiment, the sample stage has a notch designed for accommodating the prism so as to enable us to directly mount the sample plate on the top of the prism, thereby, allowing the simultaneous acquisition of TRIFM images, RDIC images and Raman spectra. In one embodiment, the sample stage is an in situ thermal annealing stage and/or an in situ solvent annealing stage.

In one embodiment, the integrated spectro-microscopic system further includes an autofocus module for providing high stability of the integrated spectro-microscopic system.

In one embodiment, the integrated spectro-microscopic system further includes a multi-modality imaging collection module for different microscopy/spectroscopy modalities.

In one embodiment, the multi-modality, multi-view imaging collection module is a fully automated, multi-modality dual view imaging and spectroscopy module that is capable of simultaneously single molecule fluorescence imaging and single molecule spectroscopy imaging; single molecule localization based 2D/3D super-resolution imaging; two-color imaging; and polarization imaging.

In one embodiment, the multi-modality, multi-view imaging collection module is a multi-modality, multi-color, 4-channel imaging module that can enable the 3D single particle tracking capability through bifocal imaging or point spread function (PSF) engineering including parallax imaging, double-helix PSF, and astigmatism.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

According to the invention, an integration system is able for the dynamic in situ acquisition of chemical information in Raman spectroscopy simultaneously with morphological information in RDIC microscopy and high-resolution high-sensitivity single-molecule and particle imaging in TIRF/TIRS microscopy.

Reflected Differential Interference Contrast Microscopy

Differential interference contrast (DIC) microscopy, in principle, is an interferometric detection technique capable of visualizing objects below the diffraction limit of light without fluorescence labeling. It has been used for decades as a complementary tool to visualize cellular features with higher contrast, better resolution, and shallower depth of field than other far-field optical imaging techniques. We have dedicated efforts over the last decade on the development of the DIC microscopy to transform it into a primary research tool for single particle orientation and rotational tracking (SPORT) of plasmonic nanoparticles in various chemical and biological systems [18-22]. Various imaging probes with different shapes (nanospheres, nanorods, nanowires, nanodumbbells, core/shell nanostructures) and compositions (gold, silver, hybrid nanomaterials) have been investigated with multiplexing detection capability [23-27]. We have also demonstrated the ability to modify and extend the existing DIC microscope into multi-modality imaging tools [22, 29, 29]. Computer simulations of the image formation in the DIC microscopy along with the scrutiny on the optical behaviors of nano-objects under different microscopic setting and experimental conditions provide theoretical guidelines and support on the future experimental designs [30-33].

The commercially available Nomarski type DIC microscopes usually adopt a two-prism transmitted-light configuration; however, many substrates in material sciences, e.g., solar cells and surface enhanced Raman scattering (SERS) substrates, are not transparent. In this invention, we extend the applicability of the DIC microscopy through building a reflected DIC (RDIC) microscope. This RDIC microscope is optimized for the simultaneous detection of individual nanoscale building blocks and intermediate features of mesoscale materials on reflective surfaces such as solar cells, and gold coated substrates, etc. The advantages of the RDIC microscopy over other conventional methods such as electron microscopy and scanning probe microscopy include noninvasive and nondestructive rapid characterization, relatively simple sample preparation, dynamic measurements in real time, and is relatively less expensive.

FIG. 1A shows schematically the RDIC microscope 110 according to one embodiment of the invention. Light 112 emitted from a light source 111, e.g., light-emitting diodes (LED), for the reflected DIC microscope 110 is collimated by a group of lenses and filters 113 and passes through a linear polarizer 115 and a beamsplitter plate (or dichroic mirror) 118 placed at 45-degree angle to the incident light beam 116. In one embodiment, there may be a mirror 114 placed between the group of lenses and filters 113 and the linear polarizer 115 in the optical path so as to reflect the collimated light beam of the light 112 into the linear polarizer 115 to obtain the incident light beam 116. Then, the light reflected by the beamsplitter plate (or dichroic mirror) 118 from the incident light beam 116 is focused onto the Nomarski prism 120 which is positioned at the rear focal plane of the objective lens 121. The Nomarski prism 120 can be translated laterally across the optical path 119 to introduce bias retardation to achieve best image contrast for different samples. The objective lens 121 then collimates sheared orthogonal wavefronts onto the sample (specimen) 123 placed on a sample plate/platform 122. Then, light from the sample (specimen) 123 responsive to illumination of the collimated orthogonal wavefronts is collected by the same objective lens 121 and focused onto the interference plane of the Nomarski prism 120 where they are recombined to eliminate shear. After passing through the Nomarski prism 120, the same beamsplitter 118 and an analyzer (or a second linear polarizer) 124, the light 128 from the sample 123 is focused on the camera 129 by a tube lens 125.

Figure 2A:
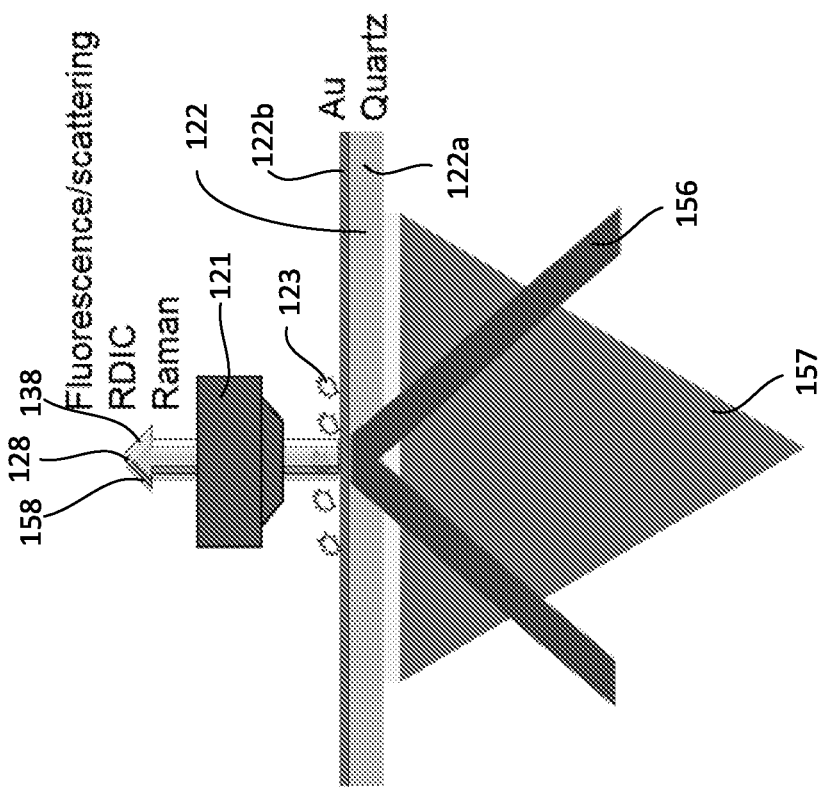
FIGS. 2A-2B show respectively a design of prism holder for the prism-type total internal reflection fluorescence (TIRF) microscopy and multi-modality imaging in one system according to embodiments of the invention.
Figure 2B:
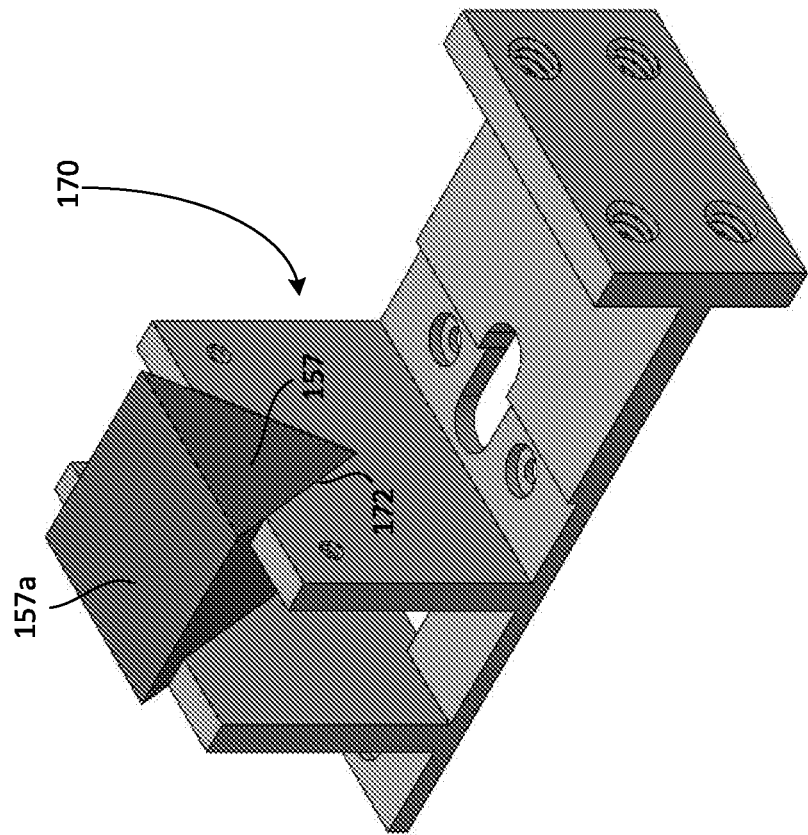

In one embodiment, as shown in FIG. 2B, the sample plate/platform 122 is a substrate of quartz slides 122a coated with nanometer thickness gold film 122b, where the gold film 122b serves as the reflection mirror for RDIC imaging. In one embodiment, the analyzer 124 is used for the RDIC to generate differential interference image patterns and allows the beams with same polarization direction as the analyzer 124 to interact and form interference images. In certain embodiments, the analyzer 124 may have an extinction ratio: 510-800 nm (>1000:1), 520-740 nm (>10000:1) and 530-640 nm (>100000:1); a laser damage threshold: about 10 W/cm$^2$ for continuous block and about 25 W/cm$^2$ for continuous pass; a clear aperture: abort 22.9 mm; an optic thickness: 280±50 um; and an operating temperature: −20° C. to 120° C.

Most of the RDIC optics are shared with the built-in confocal Raman and TIR microscopy modalities. Compared to conventional transmitted-light DIC configuration, RDIC only uses one Nomarski prism in the light path to shear the linearly polarized incident light into two orthogonally polarized wavefronts and recombine the deformed wavefronts reflected from the specimen surface. Objective lens serves as both the condenser to illuminate incident light onto the specimen and focus the wavefronts return from the specimen surface to be recombined at the same Nomarski prism interference plane. The RDIC images can be considered as a true 3D representation of the specimen surface geometry, rather than a pseudo-3D appearance of the specimen in transmitted-light DIC.

The RDIC configuration was demonstrated as early as 1979 by Lessor et. al. and applied towards surface topography studies [34]. Traditionally, RDIC has been used to both qualitatively and quantitatively report surface roughness while studying polishing techniques, and it has also found much use in visualizing details and defects in semiconductor chips made on silica wafers. However, all of the previously developed RDIC microscopes are limited to standalone systems with relatively low magnification and low resolution due to design and instrumental challenges. An oil-immersion objective with a high numerical aperture and high magnification is necessary to achieve high resolution and high sensitivity imaging in RDIC. Yet, this requires sophisticated instrumentation due to the limited space and short working distance.

However, according to the invention, the new instrument is a combinatorial spectro-microscopic system that utilizes our expertise on advanced instrumentation capability, in-depth understanding (theoretically and experimentally), and continuous efforts on the development and innovations on DIC based techniques [19, 23, 24, 28, 32, 33, 35-38]. The combinatorial spectro-microscopic system provides in situ optical characterizations with sub-diffraction-limited spatial resolution, millisecond temporal resolution for single molecule and single nanoparticle imaging while enabling the coexistence of other imaging modalities.

Integration with Confocal Raman Spectroscopy

The coupling of the Raman and DIC spectroscopy allows us to correlate the surface enhancement and inter-particle distance information. The main design challenge is to enable the coexistence of two very different sets of optics for RDIC and Raman meanwhile achieve the best image and spectra quality respectively.

Raman spectroscopy has been considered to be a powerful technique for structural analysis [39-40]. By using lasers of different frequencies from the near-ultraviolet to the near-infrared red in the Raman module, optimum excitation conditions for different samples can be achieved. By choosing lasers with appropriate frequencies, certain electronic transitions can be excited and resonance Raman studies of certain components of a sample or parts of a molecule can be performed [18,41]. Same as the RDIC microscope technique, Raman measurements are noninvasive under ambient conditions and no special sample preparation techniques are required [8,17], in contrast with infrared absorption spectroscopy [41]. The spatial and temporal resolution of Raman scattering is determined by the excitation laser spot size and pulse length. In confocal Raman technique, Raman signals from femtoliter volumes (about 1 μm$^3$) can be measured, which makes spatially resolved measurements in chromosomes and cells possible [41-42]. For temporal resolution, Raman spectra can be taken on the picosecond time scale, providing information on short-lived species such as excited states and reaction intermediates [41]. By using different data analysis techniques based on multivariate analysis, more information about the sample chemical structure and chemical composition of complex systems can be obtained [43].

In one exemplary embodiment of the invention, as shown in FIG. 1A, a combinatorial spectro-microscopic system comprises a confocal Raman system built into the RDIC microscope 110, which allow simultaneous acquisition of Raman spectra and optical microscopy images. In this embodiment, the confocal Raman system (called as Raman spectroscopy module) comprises a sample illumination 130a and a Raman spectral detection 130b, which both are optically coupled with the RDIC microscope 110.

The sample illumination 130a includes a light source such as a laser 131 for emitting light 132 and a collimating and delivering means 135 for collimating the light 132 as an incident light for illuminating/exciting the sample 123 and delivering the incident light 138 to pass through the beamsplitter plate (or dichroic mirror) 118. Then, the light reflected by the beamsplitter plate (or dichroic mirror) 118 from the incident light 138 is focused by the objective lens 121 onto the sample (specimen) 123 placed on the sample plate/platform 122 to illuminate the sample 123 therewith. In this exemplary embodiment as shown in FIG. 1A, the collimating and delivering means 135 includes, but is not limited to, five mirrors M1-M5, a flip mirror FM 137, two lenses L, and a pinhole/slit, all of which are placed in an optical path of the laser light 135. Specifically, the flip mirror FM 137 is positioned between the linear polarizer 115 and the beamsplitter plate (or dichroic mirror) 118 in the same optical path of the incident light beam 116 of the RDIC microscope 110 to reflect the light 136 obtained from the laser light 132 into the same optical path of the incident light beam 116 of the RDIC microscope 110 as the incident light 138 of the confocal Raman system. As such, the collimating and delivering means 135 also includes the beamsplitter plate (or dichroic mirror) 118 and the objective lens 121 of the RDIC microscope 110.

Raman spectral detection 130b includes a collecting means for collecting light (Raman signals) from the sample (specimen) 123 responsive to illumination of the incident light 138 of the confocal Raman system and a detector 149 for processing the collected data of the Raman signals into Raman spectra. In this exemplary embodiment as shown in FIG. 1A, the collecting means 145 includes, but is not limited to, the objective lens 121, the beamsplitter 118, and the tube lens 125 of the RDIC microscope 110, which collect and process the Raman signals from the sample 123 in response to the incident light 138 of the confocal Raman system in a collected light 138 and mirrors M6, M7 M8, relay lenses, lenses L1-L4 and a pinhole. Specifically, the mirror M6 is positioned between the tube lens 125 and the camera 129 in the same optical path of the light 128 of the RDIC microscope 110 to reflect the collected light 138 to the mirror M7, which in turns reflects it to the relay lenses. The reflected light from the collected light 139 after passing the relay lenses is reflected by the mirror M8 to a series of lenses L1-L4 and the pinhole/slit and is received by the detector 149. The detector 149 is a Raman spectrometer or a detector array such as charge-coupled devices (CCDs). Various types of CCDs can be used for optimization for different wavelength ranges. In some embodiments, the pinhole is used to reject sample signals arise from out-of-focus positions, in the meanwhile, deliver enough sample signal to the detector. The size of the pinhole depends on the objective in use (the numerical aperture of the objective and the magnifying factor of the objective), the wavelength of the light and the strength of the signal.

Figure 1C:
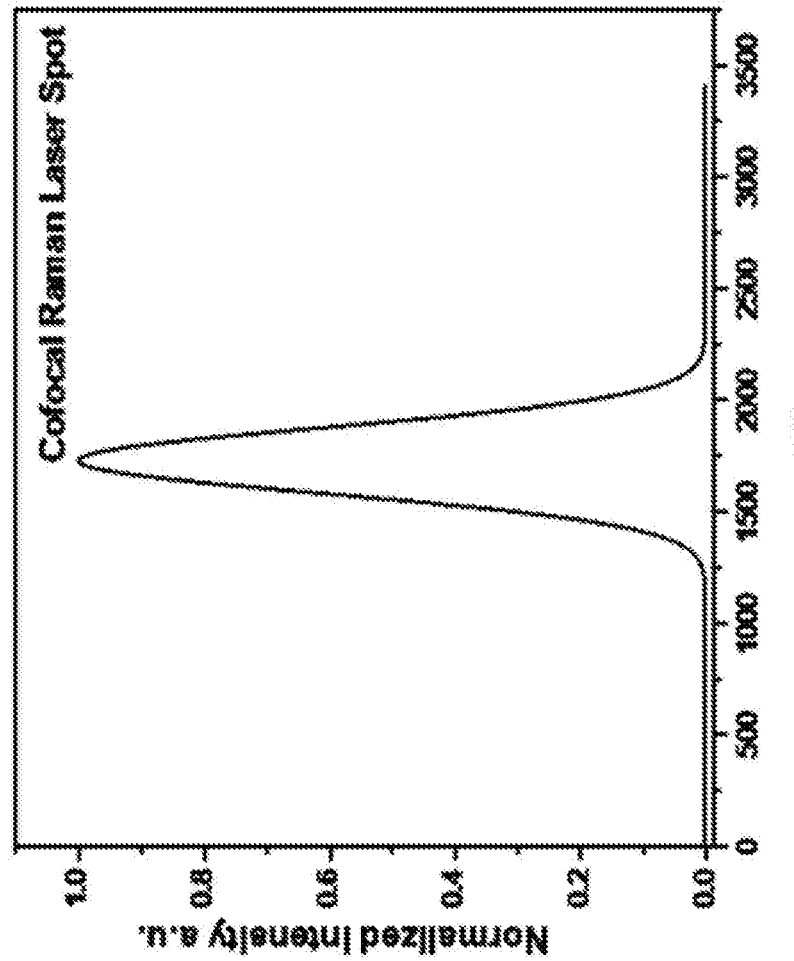
FIG. 1C shows a laser spot used in Raman spectra measurements according to one embodiment of the invention.

According to the invention, in the combinatorial spectro-microscopic system as shown in FIG. 1A, the inherent sensitivity of Raman spectroscopy on the chemical properties of the sample 123 and the inherent sensitivity of the RDIC microscopy on the topographical geometrical profile of the sample 123 are combined to provide an accurate, high throughput, non-destructive, label-free and in-situ available analytical method under ambient conditions. Raman spectra of the same area of the sample as in the RDIC image can be taken by using the Raman spectroscopy module (system) 130a-130b. In one embodiment, the laser spot size used in the Raman spectroscopy module is about 0.4 µm, as shown in FIG. 1C. In one embodiment, 488 nm laser is used as the excitation light incident on the graphene sample through a dichroic mirror and the objective. The Raman signal is collected by the same objective 121 and focused onto the spectrometer 149.

In addition, according to the invention, the flip mirror FM 137, the mirror M6, the Nomarski prism 120 and the analyzer 124 shown in FIG. 1A, are operably removable. Adding/removing these optical components changes the light path and light interaction to enable a different imaging modality, thereby, realizing the multimodality imaging on the same sample. For example, if the flip mirror FM 137 and the mirror M6 are removed, the Raman spectroscopy module 130a-130b is disconnected, the integration system is able to acquire only the RDIC image on the sample. Otherwise, the integration system can acquire simultaneously both the RDIC image and Raman spectra on the same sample. On the other hand, if the Nomarski prism 120 and the analyzer 124 are removed, the integration system can acquire only the Raman spectra on the sample. Meanwhile, TIRF, as disclosed below, can also be acquired by the integration system.

Integration with Total Internal Reflection Fluorescence Microscopy

Total internal reflection fluorescence microscopy (TIRFM) is arguably the most successful mode of fluorescence microscopy to be applied in studies of molecular dynamics, including diffusion [60-62] and absorption [63-64], at liquid/solid interfaces. Under total internal reflection (TIR) illumination the incident angle of light is varied upon a material with a high index of refraction ($n_1$). At angles beyond the critical angle, the incident light is completely reflected, and an evanescent wave is created in the adjacent medium ($n_2$), which must have a lower index of refraction than $n_1$. The penetration depth of the evanescent wave varies with the angle of incidence, the wavelength of light, and the indices of refraction of the two media. The TIR geometry provides excellent background rejection for interfacial measurements. The ratio of fluorescence intensities from sequential acquisitions with fixed-angle TIRFM and wide-field microscopy [65-66] or from two-angle TIRFM [67-70] can give good estimates of axial distances, while more depth-resolved information is obtainable with prism or objective-based variable-angle TIRFM [62, 7-74] where a stack of multi-angle images contains the integrated fluorescence intensity over various thicknesses of the sample. One of the co-inventors of the invention also invented auto-calibrated scanning-angle prism-type total internal reflection fluorescence microscopy for nanometer-precision axial position determination and optional variable-illumination-depth pseudo total internal reflection microscopy, now U.S. Pat. No. 9,012,872 [81], which is incorporated herein in its entirety by reference.

In one embodiment of the invention as shown in FIG. 1A, TIRFM is integrated into the combinatorial spectro-microscopic system as disclosed above so the benefits of near surface imaging with high signal to noise from TIRFM as well as the critical information from the RDIC and confocal Raman can be fully taken advantage of at the same time. In this exemplary embodiment, the TIRFM 150 includes a light source such as a laser 151 for emitting light 152, and a delivering means 155 having, but is not limited to, a prism 157 positioned in relation to the sample 123 over the plate 122, and a plurality of optical components placed in an incident light path for delivering the light 152 to the prism 157 at an incident angle larger that than the critical angle, so that the incidence light 156 is completely reflected and an evanescent field is generated that decays exponentially with distance and only fluorophores of the sample 123 within this evanescent field are selectively illuminated and excited. The images of the light 158 emitted from the selectively excited fluorophores of the sample 123 by the evanescent field can be acquired by the camera 129 of the RDIC microscope 110. Thus, the TIRFM 150 enables a selective visualization of surface regions of the sample/specimen 123. As shown in FIG. 1A, the delivering means 155 may include but is not limited to, mirrors M1-M5 and a lens L placed in an optical path of the light 152 and the incidence light 156, which is light of said light 152 passing the delivering means 155, to the prism 157. In one embodiment, mirror M2 may be a periscope mirror used to redirect and change the height of the light beam 152. In addition, the TIRFM 150 may include a collecting means for collecting the light 158 emitted from the selectively excited fluorophores of the sample 123, which includes the objective lens 121 and the tube lens 125 of the RDIC microscope 110. In certain embodiment, the two lasers 131 and 151 have different wavelengths, which can be used based on experiment and sample requirements. In certain embodiments, the two lasers 131 and 151 are put together to gives the system more flexibility in choosing excitation wavelength used in experiments and they can be easily interchangeably used for other modules in the system.

As shown in FIG. 2A, the invention in one aspect also relates to a sample stage 170 built for coupling prism-type TIRFM into the integration system of Raman spectroscopy with advanced light microscopy as shown in FIG. 1A. The sample stage 170 has a notch 172 designed for accommodating the prism 157 so as to enable us to directly mount sample slides 122 on the top 157a of the prism 157, thereby, allowing the simultaneous acquisition of TRIFM images 158, RDIC images 128 and Raman spectra 138, as shown in FIG. 2B. Other designs of the sample stage can also be used to practice the invention. In certain embodiments, a substrate 122 such as quartz slides 122a coated with nanometer thickness gold film 122b [75-76] is used to support the sample 123. The gold film 122b is at the interface of a glass substrate 122a and the sample 123 (e.g., cells or aqueous medium). The incident light 156 is converted to surface plasmon resonance (SPR) at the electronically conducting gold film 122b. The plasmon then creates an evanescent wave field that extends into the medium on either side of the gold film 122b. The penetration depth into the sample medium, $d_{SPR}$, is $$d_{SPR} = l\left[\frac{\lambda}{4\pi n_c}\sqrt{(\varepsilon_m + n_c^2)}\right]$$

where $\varepsilon_m$ is the dielectric constant of gold. The penetration depth at SPR varies from about 100 nm up to 5 µm as the wavelength increases from about 600 nm to 4 µm as predicted theoretically [77-79] and also verified experimentally [80]. While the evanescent wavefield at the interface with the adjacent medium can be used to excite probes for TIRFM imaging, the gold film 122b also serves as the reflection mirror for RDIC imaging.

In some embodiment, the substrate does not have to be gold coated substrates all the time and it depends on which module of the system is in use. Au as a coating metal is chosen because of its good surface plasmon behavior in surface enhance Raman experiments.

In Situ Thermal and Solvent Annealing Stages

Figure 3B:
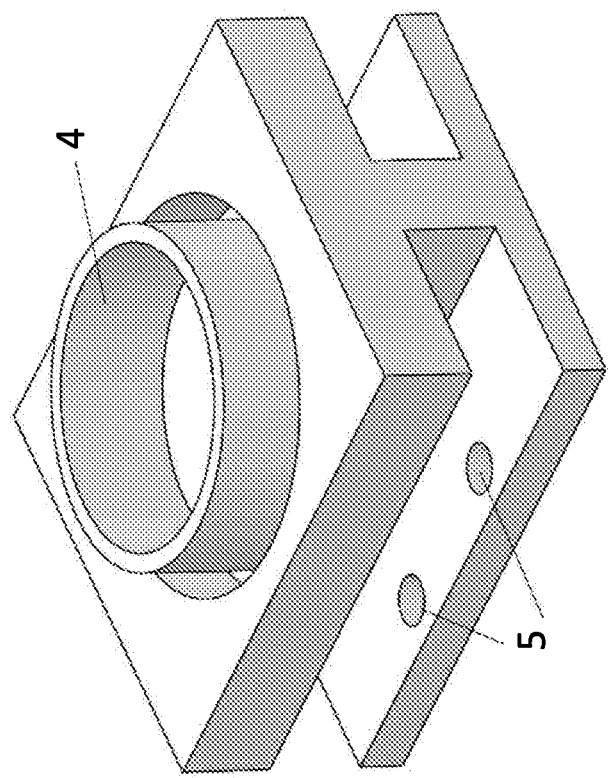
FIGS. 3A-3B show respectively a thermal annealing sample stage and a solvent annealing sample stage according to embodiments of the invention.
Figure 3A:
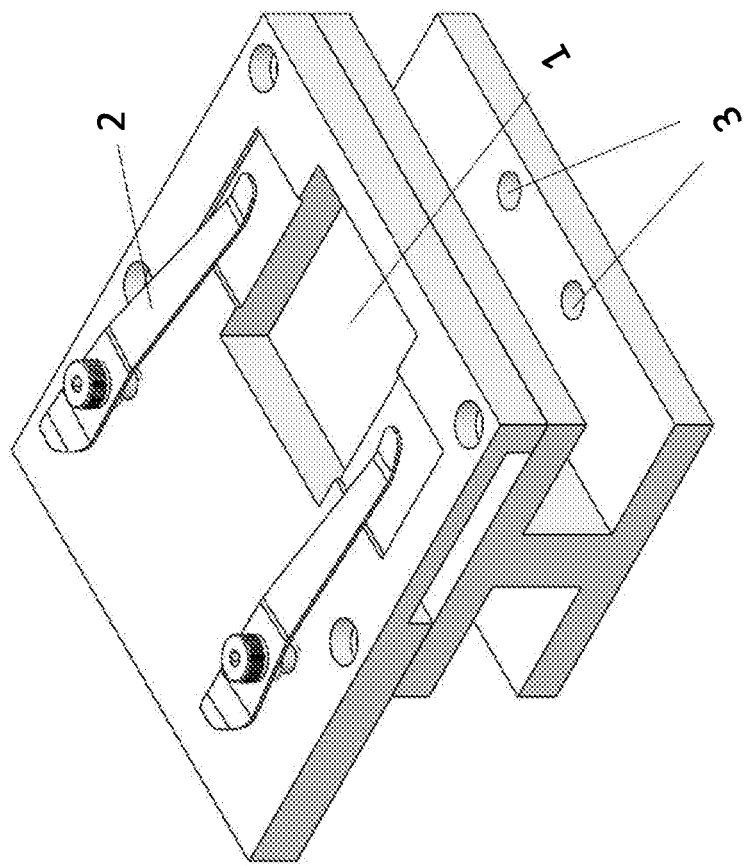

In order to perform in-situ microscopic and spectroscopic measurements of the exact same sample (or the exact same region of a sample), especially for samples under different thermal and solvent vapor conditions, we developed in situ thermal and solvent annealing stages for the integration system of the invention, as shown in FIGS. 3A and 3B.

For the thermal annealing stage, a thermoelectric cooler module, which can also be used as a heater by reversing the electric current, is inserted in the slot (noted as 1). Sample on the microscope slide is fixed by the two clips (noted as 2). The whole thermal annealing stage can be easily mounted onto optical microscope stages by using ¼-20 screws in holes 3.

For the solvent annealing stage, the solvent system chosen for the annealing process fills the cylinder holder (noted as 4). The whole solvent annealing stage can be easily mounted onto optical microscope stages by using ¼-20 screws in holes 5.

Autofocus Module

Figure 4:
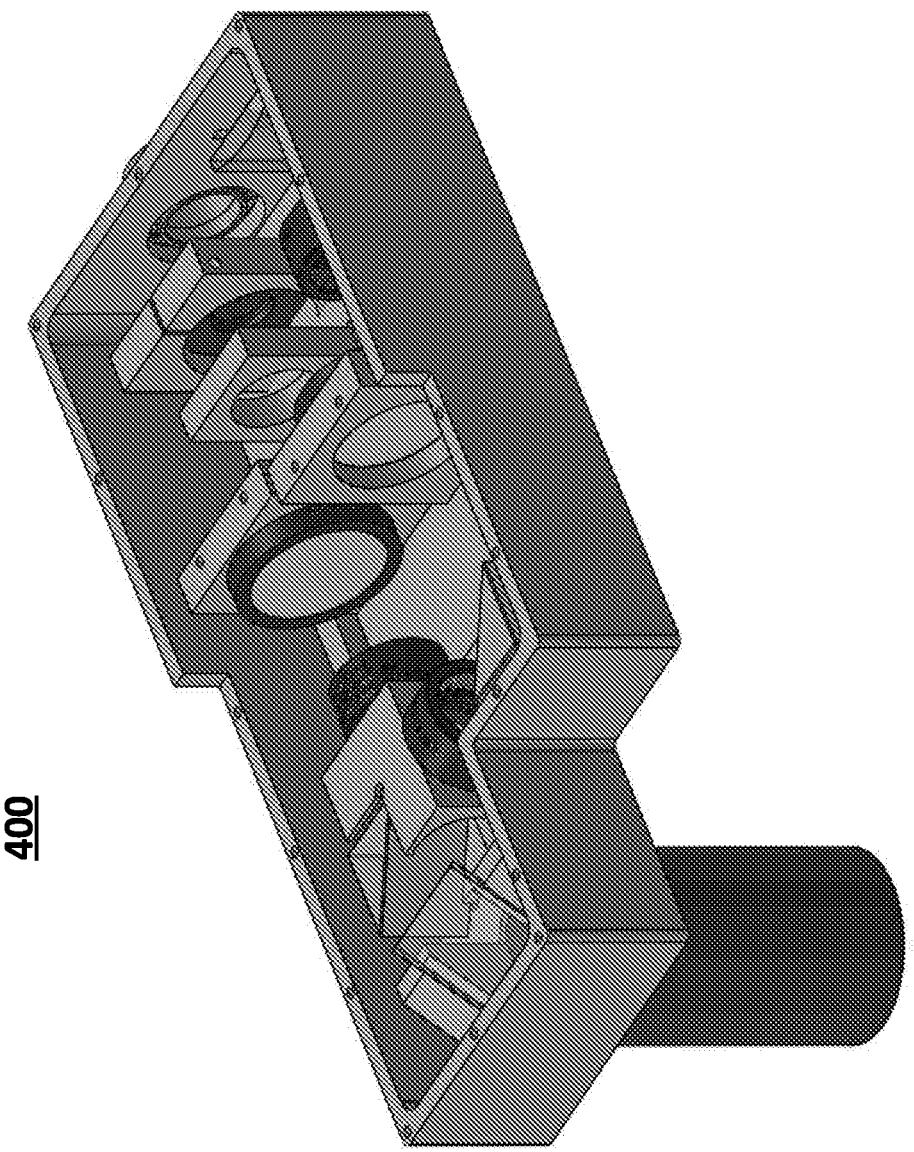
FIG. 4 shows a design of the autofocus module for upright/inverted microscope according to one embodiment of the invention.

The stability of a microscopy imaging system is very critical for precisely recovering biological, chemical events especially when it requires to record the data for long period. For example, during the thermal annealing process, focus may change with the temperature. In one embodiment, the autofocus module design 400, as shown in FIG. 4, is a readily add-on module for providing high stability of the imaging system. This add-on module works for both upright microscope and inverted microscope. The autofocus module design 400 uses the reflected light generated at the interface between sample and coverslip glass to monitor the axial movement of sample stage regarding the objective lens. A separate IR (850 nm LED) light source is coupled into the optical path using a short pass dichroitic mirror, reflected at the sample/coverslip interface, and then imaged on a CCD camera. The axial shift of sample relative to the objective lens is conjugated to the lateral shift of the reflected light beam on the CCD camera. A calibration curve was generated, stored, and then used to lock imaging plane whenever the autofocus function is activated.

Multi-Modality Imaging Collection Module

Figure 5A:
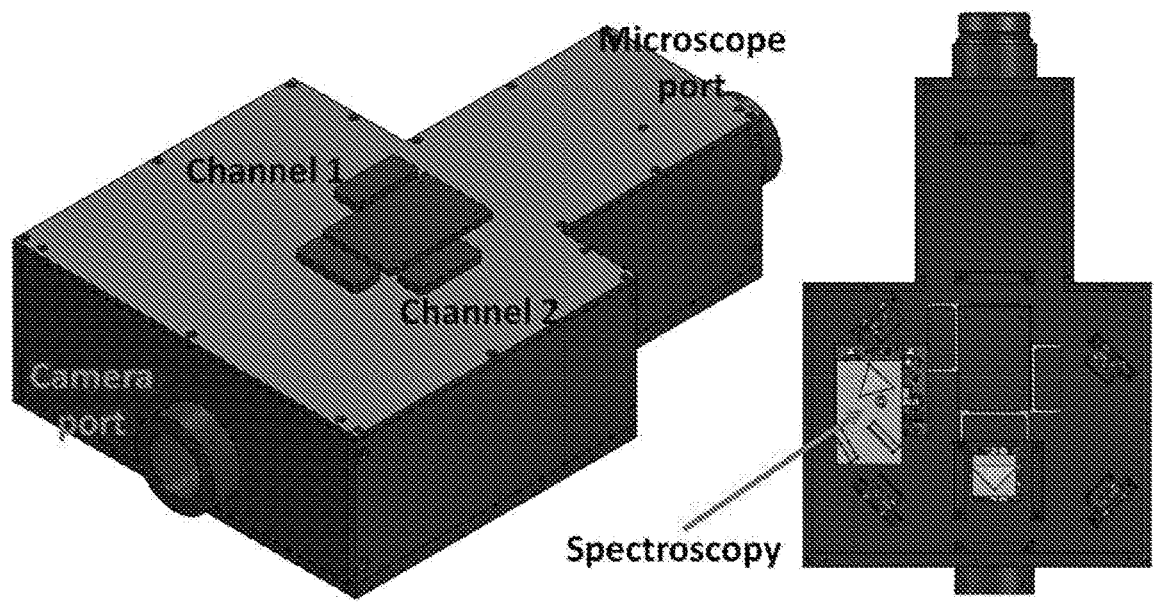
FIGS. 5A-5B show respectively fully automated, multi-modality dual view imaging and spectroscopy module, and multi-modality, 4-channel imaging module according to embodiments of the invention.
Figure 5B:
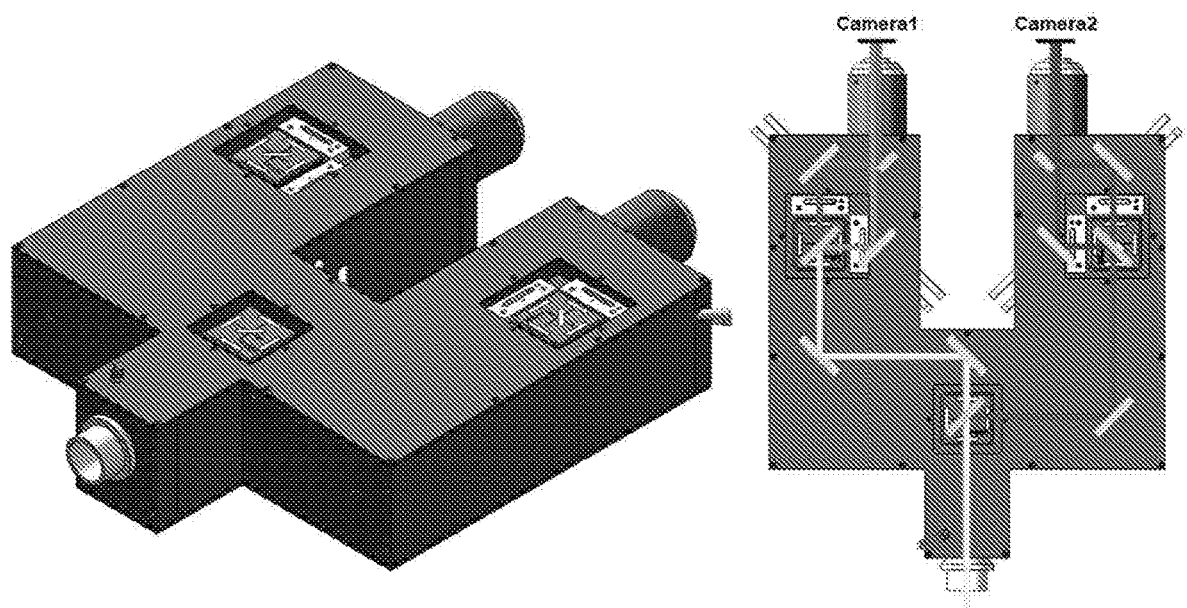

Due to the nature of collecting photons at multiple wavelengths for different microscopy/spectroscopy modalities, the multi-modality, multi-view imaging collection module is essential to accomplish the designed performance of the integration system of the invention. FIG. 5A shows a design of a fully automated, multi-modality dual view imaging and spectroscopy module that is capable of, but not limited to: 1) simultaneously single molecule fluorescence imaging and single molecule spectroscopy imaging; 2) single molecule localization based 2D/3D super-resolution imaging; 3) two-color imaging; 3) polarization imaging, etc. The collected signal (128, as shown in FIG. 1A) from the microscope body is relayed to camera by a pair of achromatic lenses and reimaged at the camera port side as shown in FIG. 5A. A cylindrical lens with 1000 mm focal length can be inserted into the optical path before first relay lens and introduce astigmatism effects for 3D super-resolution imaging. For dual view imaging, the optical signal is split into two separate optical paths (channel 1 and channel 2) using optical components such as dichroitic mirror, polarizer, beam splitter. In channel 1, an equilateral prism is mounted on a motorized stage, can be coupled into the optical path by two reflective mirrors, and disperse the optical signal by wavelength laterally, therefore, allowing spectroscopy imaging. Single view and dual imaging modes can be easily switched from one to another by removing the optical single splitting components (i.e. a dichroitic mirror, polarizer, beam splitter). FIG. 5B shows a design of a multi-modality, multi-color, 4-channel imaging module that can enable the 3D single particle tracking capability through bifocal imaging or point spread function (PSF) engineering such as parallax imaging, double-helix PSF, astigmatism, etc. The 4-channel imaging module works in a similar way as the dual view imaging module FIG. 5A but with more channels to splitting the collected signal from microscope body. Every channel has individual focusing lens (part of the relay-lens pairs) before camera, thus allowing the focal depth in every channel to be adjusted separately for bifocal imaging on the same camera (i.e. camera 1 and/or camera 2). Optical components such as wedge prism, phase masks, cylindrical lens, etc. can be inserted into the optical path in each channel, therefore, enables PSF engineering simultaneously or individually.

APPLICATION EXAMPLES

Polymer Active Layer in Bulk Heterojunction (BHJ) Organic Photovoltaic Devices: Poly(3-hexylthiophene) (P3HT) and [6,6]-phenyl-C61-butyric acid methyl ester (PCBM) blend is one of the most widely studied polymer active layer in BHJ organic photovoltaic devices. By combining the RDIC and confocal Raman modules, the molecular order and molecular change of the blend under different post deposit treatments, for example, thermal annealing and solvent annealing. FIGS. 6A-6B show respectively reflected differential interference contrast (RDIC) images of 1:1 P3HT: PCBM blend film before thermal annealing and after 30 mins thermal annealing. FIG. 6C shows RDIC intensity trace before and after thermal annealing along the dot lines shown in FIG. 6A-6B. FIG. 6D shows fractions of regio-regular P3HT in the blend before and after thermal annealing along the dot lines shown in FIG. 6A-6B.

Figure 7B:
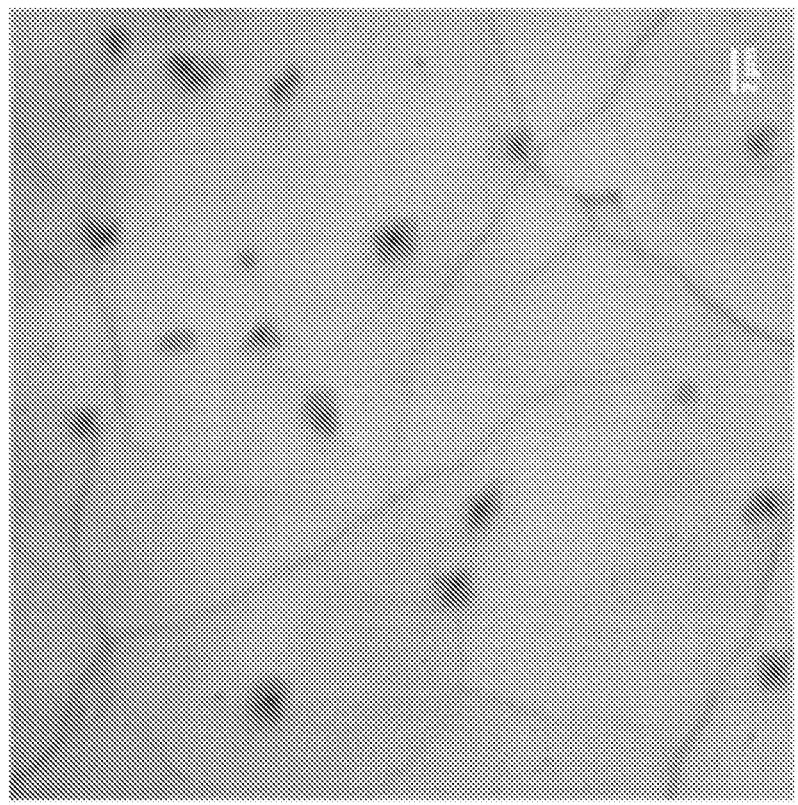
FIGS. 7A-7B show respectively an RDIC image and a bright field image of monolayer graphene according to one embodiment of the invention.
Figure 7A:
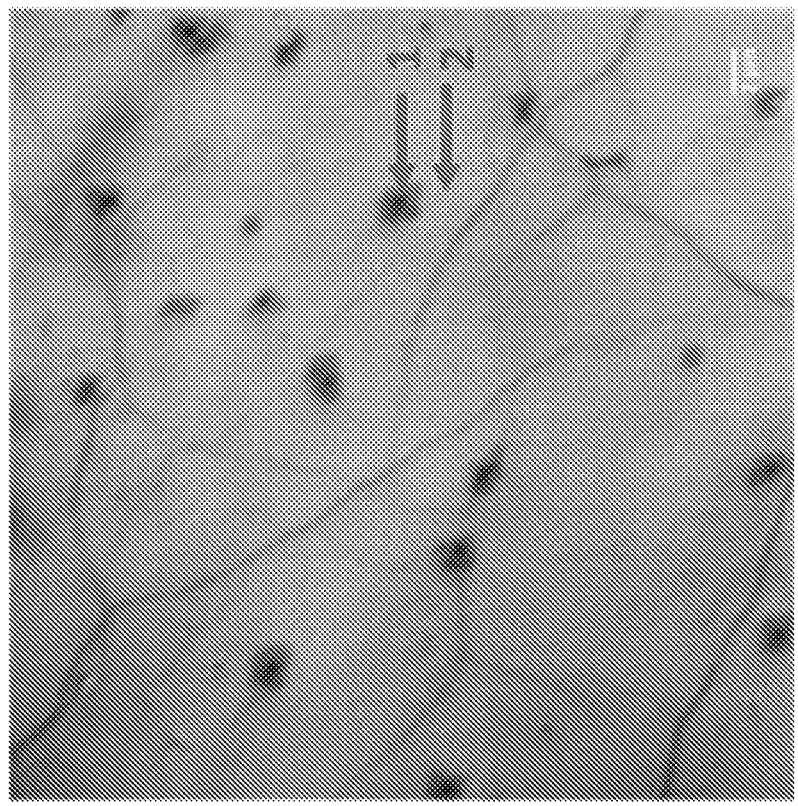
Figure 7C:
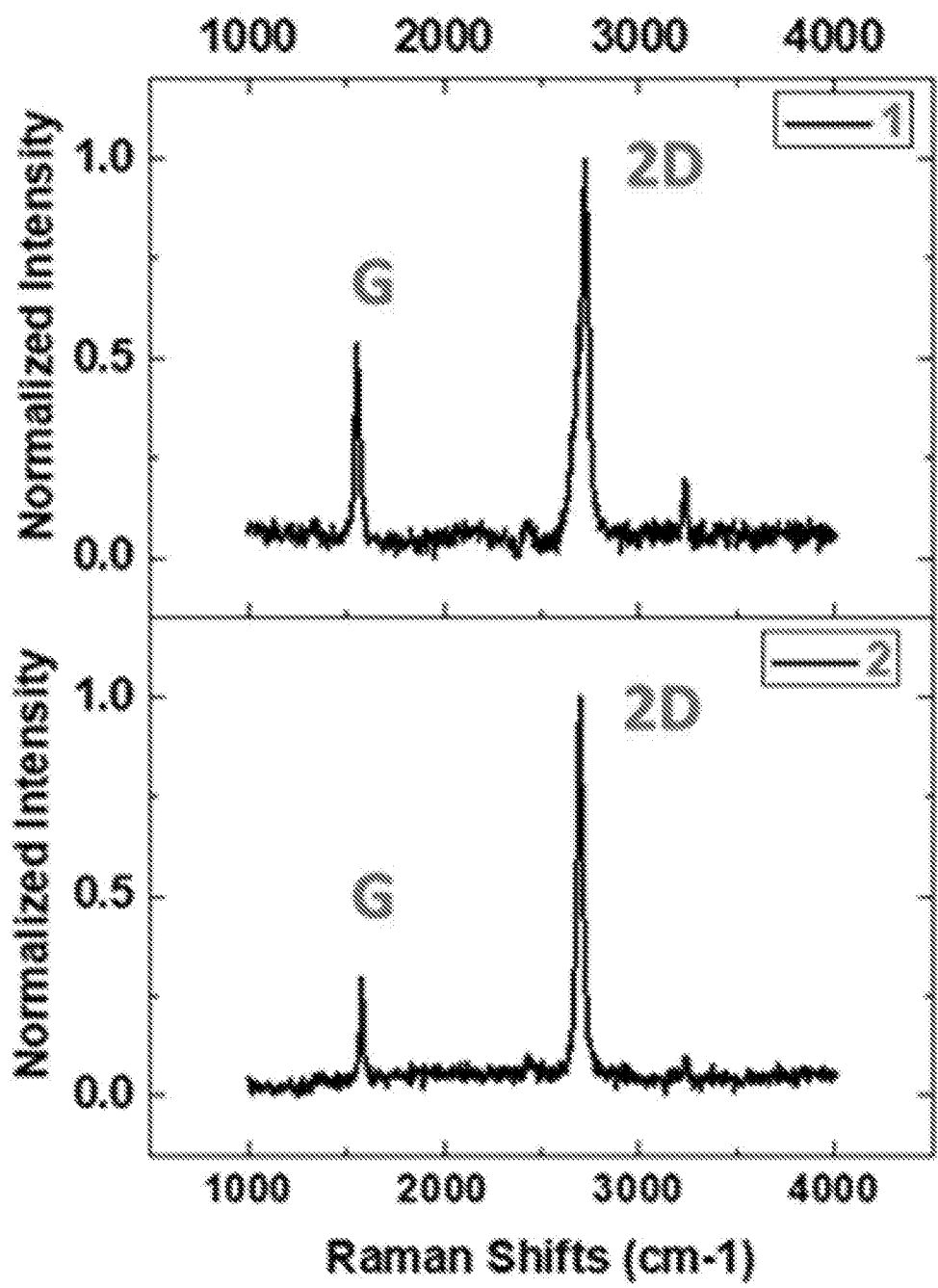
FIG. 7C shows Raman spectra of points 1 and 2 as shown in FIG. 7A according to one embodiment of the invention.

Two-dimensional Material: Graphene: By combining the RDIC and confocal Raman modules, wrinkles and multi-layer areas on the monolayer and bilayer graphene can be identified. FIGS. 7A-7C shows the Raman spectra and comparison of R-DIC and bright field images of the same monolayer graphene sample. RDIC enhanced the contrast of the multilayer and wrinkle areas of the sample. By focusing the excitation laser beam into a diffraction-limited spot showing in FIG. 1C, Raman spectra can be taken from sub-micrometer areas of samples. Therefore, a very high-resolution correlation between RDIC images and Raman spectra can be obtained. From the RDIC images in FIG. 7A, it is observed that the chemical vapor deposition (CVD) synthesized graphene sample is not spatially uniform. There are multilayer areas and wrinkles, which can be confirmed from the corresponding Raman spectra, in the sample containing an indeterminate number of layers. These areas are created during the growth as a "defect" of the layer which has significant impact on the graphene applications [56-59].

Figure 8:
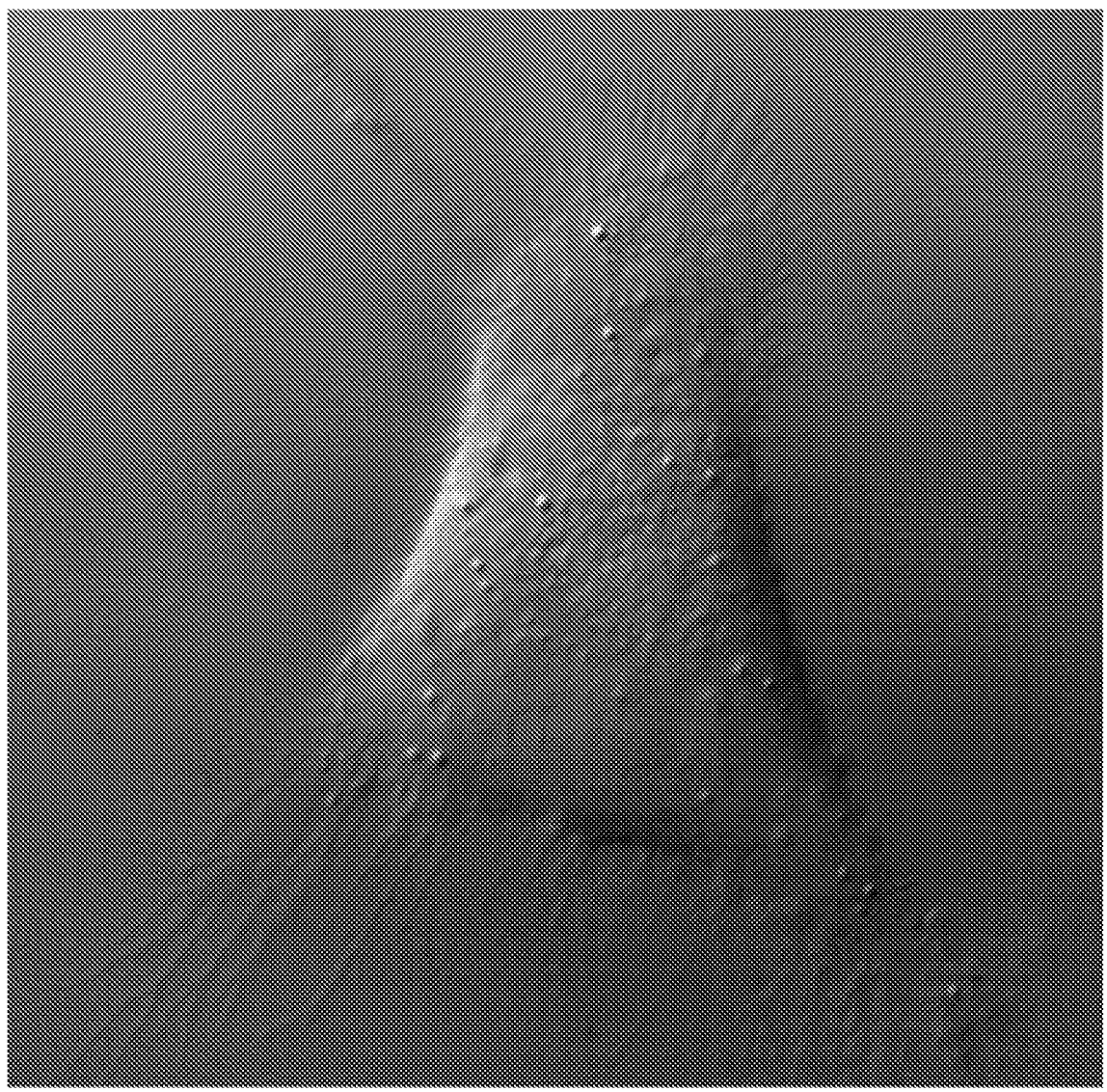
FIG. 8 shows an RDIC image of a living cell according to one embodiment of the invention.

Cell Imaging on Reflected Surfaces: By using the RDIC microscope, cells cultured with gold nanoparticles on reflected surfaces like silicon wafer, gold coated slides, are imaged with high contrast, as shown in FIG. 8.

Figures 9A, 9B:
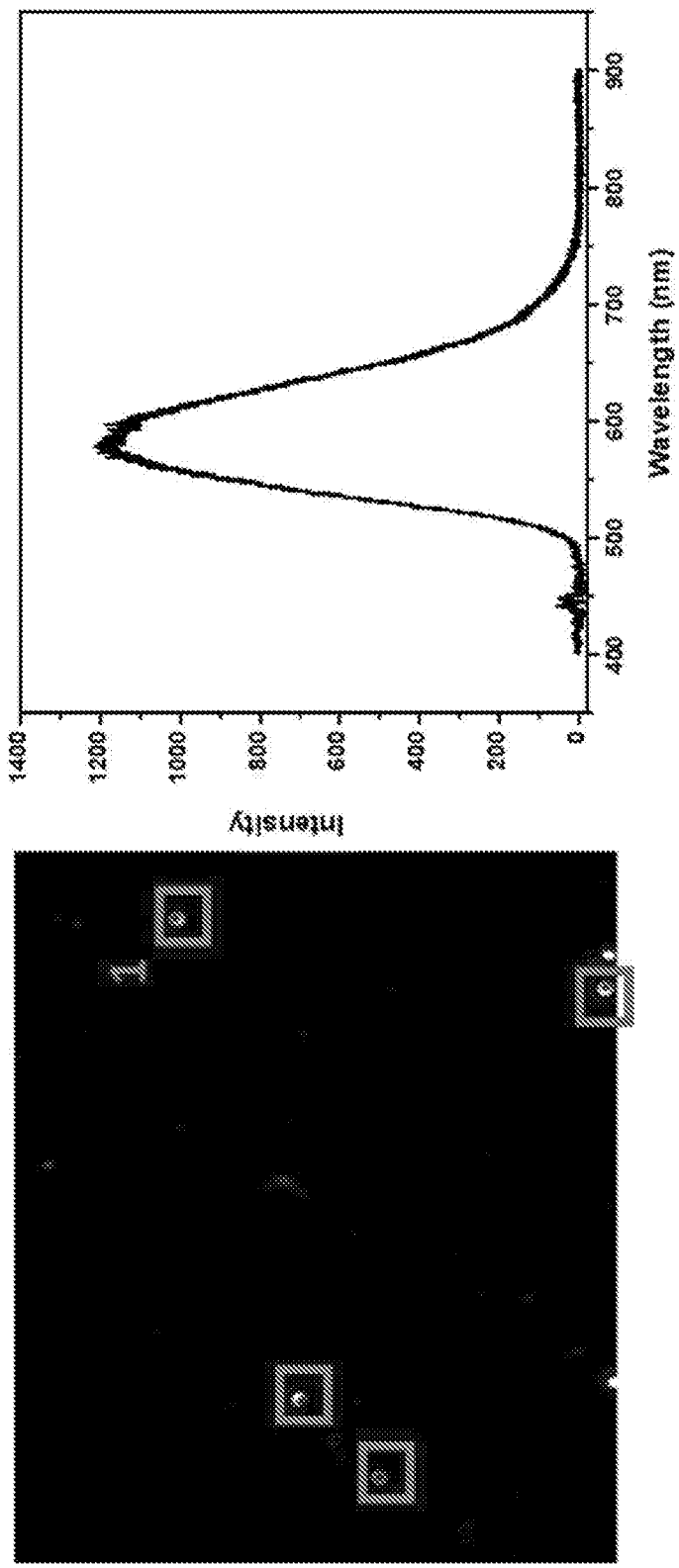
FIG. 9A shows a total internal reflection scattering (TIRS) image of 40×80 nm (SPR 650 nm) gold nanorods on 50 nm gold coated glass slides according to one embodiment of the invention.
FIG. 9B shows a scattering spectrum of the nanorod noted as 1 shown in FIG. 9A according to one embodiment of the invention.

Gold Nanoparticles on Au Coated Slides: By combining the total internal reflection scattering (TIRS) and spectroscopy modules, interaction between the gold nanoparticles and gold film are studied. FIG. 9A shows a TIRS image of 40×80 nm (SPR 650 nm) gold nanorods on 50 nm gold coated glass slides according to one embodiment of the invention, while FIG. 9B shows a scattering spectrum of the nanorod noted as 1 shown in FIG. 9A.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

LIST OF REFERENCES

[1]. Feng, S. S., Nanoparticles of biodegradable polymers for new-concept chemotherapy. (1743-4440 (Print)).
[2]. Kim, T.-H.; Kim, M.; Park, H.-S.; Shin, U. S.; Gong, M.-S.; Kim, H.-W., Size-dependent cellular toxicity of silver nanoparticles. *Journal of Biomedical Materials Research Part A* 2012, 100A (4), 1033-1043.
[3]. Sosenkova, L. S.; Egorova, E. M., The effect of particle size on the toxic action of silver nanoparticles. *Journal of Physics: Conference Series* 2011, 291 (1), 012027.
[4]. Champion, J. A.; Katare, Y. K.; Mitragotri, S., Particle shape: A new design parameter for micro- and nanoscale drug delivery carriers. *Journal of Controlled Release* 2007, 121 (1), 3-9.
[5]. Etheridge, M. L.; Campbell, S. A.; Erdman, A. G.; Haynes, C. L.; Wolf, S. M.; McCullough, J., The big picture on nanomedicine: the state of investigational and approved nanomedicine products. *Nanomedicine: Nanotechnology, Biology and Medicine* 2013, 9 (1), 1-14.
[6]. Briscoe, C. J.; Hage, D. S., Factors affecting the stability of drugs and drug metabolites in biological matrices. *Bioanalysis* 2009, 1 (1), 205-220.
[7]. French, R. A.; Jacobson, A. R.; Kim, B.; Isley, S. L.; Penn, R. L.; Baveye, P. C., Influence of ionic strength, pH, and cation valence on aggregation kinetics of titanium dioxide nanoparticles. *Environmental science & technology* 2009, 43 (5), 1354-9.
[8]. Lin, P.-C.; Lin, S.; Wang, P. C.; Sridhar, R., Techniques for physicochemical characterization of nanomaterials. *Biotechnology advances* 2014, 32 (4), 711-726.
[9]. Wojcik, M.; Li, Y.; Li, W.; Xu, K., Spatially Resolved in Situ Reaction Dynamics of Graphene via Optical Microscopy. *Journal of the American Chemical Society* 2017, 139 (16), 5836-5841.
[10]. Ma, W.; Yang, C.; Gong, X.; Lee, K.; Heeger, A. J., Thermally Stable, Efficient Polymer Solar Cells with Nanoscale Control of the Interpenetrating Network Morphology. *Advanced Functional Materials* 2005, 15 (10), 1617-1622.
[11]. Xu, Z.; Chen, L.-M.; Yang, G.; Huang, C.-H.; Hou, J.; Wu, Y.; Li, G.; Hsu, C.-S.; Yang, Y., Vertical Phase Separation in Poly(3-hexylthiophene): Fullerene Derivative Blends and its Advantage for Inverted Structure Solar Cells. *Advanced Functional Materials* 2009, 19 (8), 1227-1234.
[12]. Dang, M. T.; Hirsch, L.; Wantz, G., P3HT:PCBM, Best Seller in Polymer Photovoltaic Research. *Advanced Materials* 2011, 23 (31), 3597-3602.
[13]. Zhao, J.; Swinnen, A.; Van Assche, G.; Manca, J.; Vanderzande, D.; Mele, B. V., Phase Diagram of P3HT/PCBM Blends and Its Implication for the Stability of Morphology. *The Journal of Physical Chemistry B* 2009, 113 (6), 1587-1591.
[14]. Wang, H.; Wang, H.-Y.; Gao, B.-R.; Wang, L.; Yang, Z.-Y.; Du, X.-B.; Chen, Q.-D.; Song, J.-F.; Sun, H.-B., Exciton diffusion and charge transfer dynamics in nano phase-separated P3HT/PCBM blend films. *Nanoscale* 2011, 3 (5), 2280-2285.
[15]. Karagiannidis, P. G.; Georgiou, D.; Pitsalidis, C.; Laskarakis, A.; Logothetidis, S., Evolution of vertical phase separation in P3HT:PCBM thin films induced by thermal annealing. *Materials Chemistry and Physics* 2011, 129 (3), 1207-1213.
[16]. Baek, W.-H.; Yoon, T.-S.; Lee, H. H.; Kim, Y.-S., Composition-dependent phase separation of P3HT: PCBM composites for high performance organic solar cells. *Organic Electronics* 2010, 11 (5), 933-937.
[17]. Popović, Z. V.; Dohčević-Mitrović, Z.; Šćepanović, M.; Grujić-Brojčin, M.; Aškrabić, S., Raman scattering on nanomaterials and nanostructures. *Annalen der Physik* 2011, 523 (1-2), 62-74.

[18]. Asher, S. A.; Munro, C. H., UV lasers revolutionize Raman spectroscopy. *Laser Focus World* 1997, 33 (7), 99.

[19]. Wang, G.; Sun, W.; Luo, Y.; Fang, N., Resolving rotational motions of nano-objects in engineered environments and live cells with gold nanorods and differential interference contrast microscopy. *J Am Chem Soc* 2010, 132 (46), 16417-22.

[20]. Gu, Y.; Sun, W.; Wang, G.; Fang, N., Single particle orientation and rotation tracking discloses distinctive rotational dynamics of drug delivery vectors on live cell membranes. *J Am Chem Soc* 2011, 133 (15), 5720-3.

[21]. Gu, Y.; Sun, W.; Wang, G.; Jeftinija, K.; Jeftinija, S.; Fang, N., Rotational dynamics of cargos at pauses during axonal transport. *Nat Commun* 2012, 3, 1030.

[22]. Chen, K.; Gu, Y.; Sun, W.; Bin, D.; Wang, G.; Fan, X.; Xia, T.; Fang, N., Characteristic rotational behaviors of rod-shaped cargo revealed by automated five-dimensional single particle tracking. *Nature Communications* 2017, 8 (1), 887.

[23]. Luo, Y.; Sun, W.; Gu, Y.; Wang, G.; Fang, N., Wavelength-dependent differential interference contrast microscopy: multiplexing detection using nonfluorescent nanoparticles. *Analytical Chemistry* 2010, 82 (15), 6675-9.

[24]. Sun, W.; Wang, G.; Fang, N.; Yeung, E. S., Wavelength-dependent differential interference contrast microscopy: selectively imaging nanoparticle probes in live cells. *Anal Chem* 2009, 81 (22), 9203-8.

[25]. Ha, J. W.; Chen, K.; Fang, N., Differential interference contrast microscopy imaging of micrometer-long plasmonic nanowires. *Chemical communications* 2013, 49 (94), 11038-40.

[26]. Stender, A. S.; Wei, X.; Augspurger, A. E.; Fang, N., Plasmonic Behavior of Single Gold Dumbbells and Simple Dumbbell Geometries. *The Journal of Physical Chemistry C* 2013, 117 (31), 16195-16202.

[27]. Chen, K.; Lin, C. C.; Vela, J.; Fang, N., Multishell Au/Ag/SiO2 nanorods with tunable optical properties as single particle orientation and rotational tracking probes. *Anal Chem* 2015, 87 (8), 4096-9.

[28]. Sun, W.; Gu, Y.; Wang, G.; Fang, N., Dual-Modality Single Particle Orientation and Rotational Tracking of Intracellular Transport of Nanocargos. *Anal. Chem.* 2012, 84 (2), 1134-1138.

[29]. Gu, Y.; Wang, G.; Fang, N., Simultaneous single-particle superlocalization and rotational tracking. *ACS Nano* 2013, 7 (2), 1658-1665.

[30]. Gu, Y.; Sun, W.; Wang, G.; Zimmermann, M. T.; Jernigan, R. L.; Fang, N., Revealing Rotational Modes of Functionalized Gold Nanorods on Live Cell Membranes. *Small* 2013, 9, 785.

[31]. Zhao, F.; Chen, K.; Dong, B.; Yang, K.; Gu, Y.; Fang, N., Localization accuracy of gold nanoparticles in single particle orientation and rotational tracking. *Opt. Express* 2017, 25 (9), 9860-9871.

[32]. Stender, A. S.; Augspurger, A. E.; Wang, G.; Fang, N., Influence of Polarization Setting on Gold Nanorod Signal at Nonplasmonic Wavelengths Under Differential Interference Contrast Microscopy. *Analytical Chemistry* 2012.

[33]. Stender, A. S.; Wang, G.; Sun, W.; Fang, N., Influence of Gold Nanorod Geometry on Optical Response. *ACS Nano* 2010, 4 (12), 7667-7675.

[34]. Lessor, D. L.; Hartman, J. S.; Gordon, R. L., QUANTITATIVE SURFACE-TOPOGRAPHY DETERMINATION BY NOMARSKI REFLECTION MICROSCOPY 1. THEORY. *Journal of the Optical Society of America* 1979, 69 (2), 357-366.

[35]. Sun, W.; Marchuk, K.; Wang, G.; Fang, N., Autocalibrated Scanning-Angle Prism-Type Total Internal Reflection Fluorescence Microscopy for Nanometer-Precision Axial Position Determination. *Analytical Chemistry* 2010, 82 (6), 2441-2447.

[36]. Stender, A. S.; Marchuk, K.; Liu, C.; Sander, S.; Meyer, M. W.; Smith, E. A.; Neupane, B.; Wang, G.; Li, J.; Cheng, J.-X.; Huang, B.; Fang, N., Single Cell Optical Imaging and Spectroscopy. *Chem. Rev.* 2013, 113 (4), 2469-2527.

[37]. Gu, Y.; Di, X.; Sun, W.; Wang, G.; Fang, N., Three-Dimensional Super-Localization and Tracking of Single Gold Nanoparticles in Cells. *Anal Chem* 2012.

[38]. Gu, Y.; Ha, J. W.; Augspurger, A. E.; Chen, K.; Zhu, S.; Fang, N., Single Particle Orientation and Rotational Tracking (SPORT) in biophysical studies. *Nanoscale* 2013, 5 (22), 10753-64.

[39]. Lu, D. Y.; Chen, J.; Deng, S. Z.; Xu, N. S.; Zhang, W. H., The most powerful tool for the structural analysis of tungsten suboxide nanowires: Raman spectroscopy. *Journal of Materials Research* 2011, 23 (2), 402-408.

[40]. Beyssac, O.; Goffé, B.; Petitet, J.-P.; Froigneux, E.; Moreau, M.; Rouzaud, J.-N., On the characterization of disordered and heterogeneous carbonaceous materials by Raman spectroscopy. *Spectrochimica Acta Part A: Molecular and Biomolecular Spectroscopy* 2003, 59 (10), 2267-2276.

[41]. Kneipp, K.; Kneipp, H.; Itzkan, I.; Dasari, R. R.; Feld, M. S., Ultrasensitive Chemical Analysis by Raman Spectroscopy. *Chemical Reviews* 1999, 99 (10), 2957-2976.

[42]. Puppels, G. J.; de Mul, F. F. M.; Otto, C.; Greve, J.; Robert-Nicoud, M.; Arndt-Jovin, D. J.; Jovin, T. M., Studying single living cells and chromosomes by confocal Raman microspectroscopy. *Nature* 1990, 347, 301.

[43]. Hanlon, E. B.; Manoharan, R.; Koo, T. W.; Shafer, K. E.; Motz, J. T.; Fitzmaurice, M.; Kramer, J. R.; Itzkan, I.; Dasari, R. R.; Feld, M. S., Prospects for in vivo Raman spectroscopy. *Physics in Medicine & Biology* 2000, 45 (2), R1.

[44]. Gupta, A.; Chen, G.; Joshi, P.; Tadigadapa, S.; Eklund, Raman Scattering from High-Frequency Phonons in Supported n-Graphene Layer Films. *Nano Letters* 2006, 6 (12), 2667-2673.

[45]. Ni, Z.; Wang, Y.; Yu, T.; Shen, Z., Raman spectroscopy and imaging of graphene. *Nano Research* 2008, 1 (4), 273-291.

[46]. Ni, Z. H.; Yu, T.; Lu, Y. H.; Wang, Y. Y.; Feng, Y. P.; Shen, Z. X., Uniaxial Strain on Graphene: Raman Spectroscopy Study and Band-Gap Opening. *ACS Nano* 2008, 2 (11), 2301-2305.

[47]. Havener, R. W.; Ju, S.-Y.; Brown, L.; Wang, Z.; Wojcik, M.; Ruiz-Vargas, C. S.; Park, J., High-Throughput Graphene Imaging on Arbitrary Substrates with Widefield Raman Spectroscopy. *ACS Nano* 2012, 6 (1), 373-380.

[48]. Roddaro, S.; Pingue, P.; Piazza, V.; Pellegrini, V.; Beltram, F., The Optical Visibility of Graphene: Interference Colors of Ultrathin Graphite on SiO2. *Nano Letters* 2007, 7 (9), 2707-2710.

[49]. Casiraghi, C.; Hartschuh, A.; Lidorikis, E.; Qian, H.; Harutyunyan, H.; Gokus, T.; Novoselov, K. S.; Ferrari, A. C., Rayleigh Imaging of Graphene and Graphene Layers. *Nano Letters* 2007, 7 (9), 2711-2717.

[50]. Ni, Z. H.; Wang, H. M.; Kasim, J.; Fan, H. M.; Yu, T.; Wu, Y. H.; Feng, Y. P.; Shen, Z. X., Graphene Thickness Determination Using Reflection and Contrast Spectroscopy. *Nano Letters* 2007, 7 (9), 2758-2763.

[51]. Reina, A.; Jia, X.; Ho, J.; Nezich, D.; Son, H.; Bulovic, V.; Dresselhaus, M. S.; Kong, J., Large Area, Few-Layer Graphene Films on Arbitrary Substrates by Chemical Vapor Deposition. *Nano Letters* 2009, 9 (1), 30-35.

[52]. Li, W.; Moon, S.; Wojcik, M.; Xu, K., Direct Optical Visualization of Graphene and Its Nanoscale Defects on Transparent Substrates. *Nano Letters* 2016, 16 (8), 5027-5031.

[53]. Pimenta, M. A.; Dresselhaus, G.; Dresselhaus, M. S.; Cancado, L. G.; Jorio, A.; Saito, R., Studying disorder in graphite-based systems by Raman spectroscopy. Physical Chemistry *Chemical Physics* 2007, 9 (11), 1276-1290.

[54]. Graf, D.; Molitor, F.; Ensslin, K.; Stampfer, C.; Jungen, A.; Hierold, C.; Wirtz, L., Raman imaging of graphene. *Solid State Communications* 2007, 143 (1), 44-46.

[55]. Malard, L. M.; Pimenta, M. A.; Dresselhaus, G.; Dresselhaus, M. S., Raman spectroscopy in graphene. *Physics Reports* 2009, 473 (5), 51-87.

[56]. Vicarelli, L.; Heerema, S. J.; Dekker, C.; Zandbergen, H. W., Controlling Defects in Graphene for Optimizing the Electrical Properties of Graphene Nanodevices. *ACS Nano* 2015, 9 (4), 3428-3435.

[57]. Liu, L.; Qing, M.; Wang, Y.; Chen, S., Defects in Graphene: Generation, Healing, and Their Effects on the Properties of Graphene: A Review. *Journal of Materials Science & Technology* 2015, 31 (6), 599-606.

[58]. ls. *Materials Today* 2012, 15 (3), 98-109.

[59]. Vicarelli, L.; Heerema, S.; Dekker, C.; Zandbergen, H., *Controlling Defects in Graphene for Optimizing the Electrical Properties of Graphene Nanodevices.* 2015; Vol. 9.

[60]. Xu, X. H.; Yeung, E. S., Direct measurement of single-molecule diffusion and photodecomposition in free solution. *Science* 1997, 275 (5303), 1106-1109.

[61]. Xu, X. H. N.; Yeung, E. S., Long-range electrostatic trapping of single-protein molecules at a liquid-solid interface. *Science* 1998, 281 (5383), 1650-1653.

[62]. He, Y.; Li, H. W.; Yeung, E. S., Motion of single DNA molecules at a liquid-solid interface as revealed by variable-angle evanescent-field microscopy. *J. Phys. Chem. B* 2005, 109 (18), 8820-8832.

[63]. Kang, S. H.; Shortreed, M. R.; Yeung, E. S., Real-Time Dynamics of Single-DNA Molecules Undergoing Adsorption and Desorption at Liquid-Solid Interfaces. *Anal. Chem.* 2001, 73, 1091-1099.

[64]. Kang, S. H.; Yeung, E. S., Dynamics of single-protein molecules at a liquid/solid interface: Implications in capillary electrophoresis and chromatography. *Anal. Chem.* 2002, 74 (24), 6334-6339.

[65]. Omann, G. M.; Axelrod, D., Membrane-proximal calcium transients in stimulated neutrophils detected by total internal reflection fluorescence. *Biophysical Journal* 1996, 71 (5), 2885-2891.

[66]. Merrifield, C. J.; Feldman, M. E.; Wan, L.; Almers, W., Imaging actin and dynamin recruitment during invagination of single clathrin-coated pits. *Nat. Cell Biol.* 2002, 4 (9), 691-698.

[67]. Marchuk, K.; Guo, Y.; Sun, W.; Vela, J.; Fang, N., High-precision tracking with non-blinking quantum dots resolves nanoscale vertical displacement. *J. Am. Chem. Soc.* 2012, 134 (14), 6108-6111.

[68]. Sun, W.; Marchuk, K.; Wang, G. F.; Fang, N., Auto-calibrated Scanning-Angle Prism-Type Total Internal Reflection Fluorescence Microscopy for Nanometer-Precision Axial Position Determination. *Anal. Chem.* 2010, 82 (6), 2441-2447.

[69]. Sun, W.; Xu, A.; Marchuk, K.; Wang, G.; Fang, N., Whole-Cell Scan Using Automatic Variable-Angle and Variable-Illumination-Depth Pseudo-Total Internal Reflection Fluorescence Microscopy. *Journal of Laboratory Automation* 2011, 16 (4), 255-262.

[70]. Lanni, F.; Waggoner, A. S.; Taylor, D. L., Structural Organization of Interphase 3T3-Fibroblasts Studied by Total Internal-Reflection Fluorescence Microscopy. *Journal of Cell Biology* 1985, 100 (4), 1091-1102.

[71]. Loerke, D.; Stuhmer, W.; Oheim, M., Quantifying axial secretory-granule motion with variable-angle evanescent-field excitation. *J. Neurosci. Methods* 2002, 119 (1), 65-73.

[72]. Olveczky, B. P.; Periasamy, N.; Verkman, A. S., Mapping fluorophore distributions in three dimensions by quantitative multiple angle-total internal reflection fluorescence microscopy. *Biophys. J.* 1997, 73 (5), 2836-2847.

[73]. Rohrbach, A., Observing secretory granules with a multiangle evanescent wave microscope. *Biophys. J.* 2000, 78 (5), 2641-2654.

[74]. Gell, C.; Berndt, M.; Enderlein, J.; Diez, S., TIRF microscopy evanescent field calibration using tilted fluorescent microtubules. *Journal of Microscopy-Oxford* 2009, 234 (1), 38-46.

[75]. Fang, Y., Total Internal Reflection Fluorescence Quantification of Receptor Pharmacology. *Biosensors* 2015, 5 (2), 223-240.

[76]. Ha, J. W.; Marchuk, K.; Fang, N., Focused orientation and position imaging (FOPI) of single anisotropic plasmonic nanoparticles by total internal reflection scattering microscopy. *Nano Lett.* 2012, 12 (8), 4282-8.

[77]. Tang, Y.; Zeng, X.; Liang, J., Surface Plasmon Resonance: An Introduction to a Surface Spectroscopy Technique. *Journal of chemical education* 2010, 87 (7), 742-746.

[78]. Johansen, K.; Arwin, H.; Lundstrom, I.; Liedberg, B., Imaging surface plasmon resonance sensor based on multiple wavelengths: Sensitivity considerations. *Review of Scientific Instruments* 2000, 71 (9), 3530-3538.

[79]. Golosovsky, M.; Lirtsman, V.; Yashunsky, V.; Davidov, D.; Aroeti, B., Midinfrared surface-plasmon resonance: A novel biophysical tool for studying living cells. *Journal of Applied Physics* 2009, 105 (10), 102036.

[80]. Liu, A.; Peng, J.; Li, G., Characterizing penetration depths of multi-wavelength surface plasmon resonance sensor using silica beads. *Applied Physics Letters* 2014, 104 (21), 211103.

[81]. Fang, N. and Sun, W., Auto-Calibrated Scanning-Angle Prism-Type Total Internal Reflection Fluorescence Microscopy for Nanometer-Precision Axial Position Determination and Optional Variable-Illumination-Depth Pseudo Total Internal Reflection Microscopy, U.S. Pat. No. 9,012,872, Apr. 21, 2015.

What is claimed is:

1. An integrated spectro-microscopic system for multi-modality imaging on a sample, comprising:
   a reflected differential interference contrast (RDIC) microscope;
   a Raman spectroscope optically coupled with the RDIC microscope such that the integrated spectro-microscopic system is capable of simultaneously acquiring both RDIC images and Raman spectra on the same sample; and
   a total internal reflection fluorescence/scattering (TIRF/TIRS) microscope optically coupled with the RDIC microscope such that the integrated spectro-microscopic system is capable of simultaneously acquiring both the RDIC images, the Raman spectra and TIRF/TIRS images on the same sample.

2. The integrated spectro-microscopic system of claim 1, wherein the integrated spectro-microscopic system is capable of individually acquiring the RDIC images, the Raman spectra and the TIRF/TIRS images on the same sample, by removing selected optical components.

3. The integrated spectro-microscopic system of claim 1, wherein each of the RDIC microscope, the Raman spectroscope and the TIRF/TIRS microscope comprises a delivering means for delivering incident light emitted from a corresponding light source to the sample placed on a substrate to illuminate the sample therewith, and a collecting means for collecting light from the illuminated sample responsive to the illumination of the incident light.

4. The integrated spectro-microscopic system of claim 3, wherein the delivering means of the RDIC microscope comprises a linear polarizer, a beamsplitter, a Nomarski prism and an objective lens placed in a first optical path that is an incident light path of the RDIC microscope such that the beamsplitter is placed at 45° to the incident light; the Nomarski prism is positioned at a rear focal plane of the objective lens, and is operably translated laterally across the optical path to introduce bias retardation to achieve best image contrast for the sample; and the objective lens is positioned proximate to the sample and operably collimates sheared orthogonal wavefronts onto the sample.

5. The integrated spectro-microscopic system of claim 4, wherein the delivering means of the Raman spectroscope comprises the beamsplitter, the objective lens and an operably removable mirror positioned between the linear polarizer and the beamsplitter in the first optical path such that when the operably removable mirror is removed, no incident light of the Raman microscope is delivered to the sample.

6. The integrated spectro-microscopic system of claim 4, wherein the collecting means of the RDIC microscope comprises the objective lens, the Nomarski prism, the beamsplitter, an analyzer and a tube lens placed in a second optical path such that light from the sample responsive to illumination of the collimated orthogonal wavefronts is collected by the objective lens and focused onto an interference plane of the Nomarski prism, passes the beamsplitter and the analyzer, and is focused on a camera by the tube lens.

7. The integrated spectro-microscopic system of claim 6, wherein the collecting means of the Raman spectroscope comprises the objective lens, the beamsplitter, the tube lens and a mirror placed in the second optical path such that Raman signals emitted from the sample responsive to illumination of the incident light of the Raman spectroscope is collected by the objective lens and passes the beamsplitter and the tube lens, and is reflected through a third optical path to a detector of the Raman spectroscope.

8. The integrated spectro-microscopic system of claim 6, wherein the collecting means of the TIRF/TIRS microscope comprises the objective lens, the beamsplitter, and the tube lens placed in the second optical path such that light emitted from the selectively excited fluorophores of the sample is collected by the objective lens and passes the beamsplitter, and is focused on the camera by the tube lens.

9. The integrated spectro-microscopic system of claim 3, wherein the delivering means of the TIRF/TIRS microscope comprises a prism positioned in relation to the sample and a plurality of optical components placed in an incident light path of the TIRF/TIRS microscope for delivering incident light to the prism at an incident angle larger that than the critical angle, so that the incidence light is completely reflected and an evanescent field is generated to selectively illuminate and excite fluorophores of the sample within the evanescent field, wherein the substrate is between the sample and the prism.

10. The integrated spectro-microscopic system of claim 3, wherein the beamsplitter plate is a dichroic mirror.

11. The integrated spectro-microscopic system of claim 3, wherein the substrate comprises a quartz slide coated with a nanometer thickness gold film on which the sample is placed.

12. The integrated spectro-microscopic system of claim 1, further comprising a sample stage for coupling the prism-type TIRF microscope to the integrated spectro-microscopic system.

13. The integrated spectro-microscopic system of claim 12, wherein the sample stage has a notch designed for accommodating the prism so as to enable us to directly mount the sample plate on the top of the prism, thereby, allowing the simultaneous acquisition of TRIFM images, RDIC images and Raman spectra.

14. The integrated spectro-microscopic system of claim 12, wherein the sample stage is an in situ thermal annealing stage and/or an in situ solvent annealing stage.

15. The integrated spectro-microscopic system of claim 1, further comprising an autofocus module for providing high stability of the integrated spectro-microscopic system.

16. The integrated spectro-microscopic system of claim 1, further comprising a multi-modality imaging collection module for different microscopy/spectroscopy modalities.

17. The integrated spectro-microscopic system of claim 16, wherein the multi-modality, multi-view imaging collection module is a fully automated, multi-modality dual view imaging and spectroscopy module that is capable of simultaneously single molecule fluorescence imaging and single molecule spectroscopy imaging; single molecule localization based 2D/3D super-resolution imaging; two-color imaging; and polarization imaging.

18. The integrated spectro-microscopic system of claim 16, wherein the multi-modality, multi-view imaging collection module is a multi-modality, multi-color, 4-channel imaging module that can enable the 3D single particle tracking capability through bifocal imaging or point spread function (PSF) engineering including parallax imaging, double-helix PSF, and astigmatism.

* * * * *